United States Patent
Tamai et al.

(10) Patent No.: US 8,343,314 B2
(45) Date of Patent: Jan. 1, 2013

(54) PULP FEEDER FOR USED PAPER RECYCLING APPARATUS

(75) Inventors: Shigeru Tamai, Osaka (JP); Yuji Koyama, Osaka (JP)

(73) Assignee: Seed Company Limited, Osaka (JP)

( * ) Notice: Subject to any disclaimer, the term of this patent is extended or adjusted under 35 U.S.C. 154(b) by 277 days.

(21) Appl. No.: 11/971,117

(22) Filed: Jan. 8, 2008

(65) Prior Publication Data

US 2008/0210400 A1 Sep. 4, 2008

(30) Foreign Application Priority Data

Jan. 20, 2007 (JP) .................... 2007-010904

(51) Int. Cl.
*D21F 1/02* (2006.01)
*D21F 1/26* (2006.01)
(52) U.S. Cl. ............ 162/336; 162/315; 162/350
(58) Field of Classification Search ........... 162/147, 162/212, 336, 350
See application file for complete search history.

(56) References Cited

U.S. PATENT DOCUMENTS

| | | | | |
|---|---|---|---|---|
| 1,982,349 A | * | 11/1934 | McDonnell | 162/350 |
| 2,148,613 A | * | 2/1939 | Frost | 162/336 |
| 5,567,273 A | * | 10/1996 | Offerhaus et al. | 162/199 |

FOREIGN PATENT DOCUMENTS

JP 06-134331 A 5/1994

OTHER PUBLICATIONS

Smook, Handbook for Pulp and Paper Technologists, 1992, Angus Wilde Publications, 2nd edition, chapters 14,16, and 24.*
Can-am Machinery, The Story of the Eagle Paper Machine [downlaoded online from www.canammachinery.com], downloaded on Jul. 20, 2009, whole document.*

* cited by examiner

*Primary Examiner* — Anthony Calandra
(74) *Attorney, Agent, or Firm* — Cheng Law Group, PLLC

(57) ABSTRACT

A pulp feeder for used paper recycling apparatus being installed in a room of a small shop or the like, friendly to the environment, low in running cost, and capable of maintaining a high confidentiality is presented. The pulp feeder includes a partition member disposed slidably on the downside of a running endless mesh belt, and a paper making frame body disposed slidably on the upside of the mesh belt, and an overflow gate is provided in the paper making frame body for keeping constant the water level of the collected pulp suspension, and the pulp suspension supplied in the paper making frame body is collected up to a specific water level defined by the overflow gate, and is uniformly diffused and supplied on the upside of the running mesh belt. Accordingly, if the supply water volume of pulp suspension fluctuates, the water level of pulp suspension staying in the paper making frame body is always kept constant, and the weight of the wet paper manufactured on the mesh belt is stabilized.

14 Claims, 11 Drawing Sheets

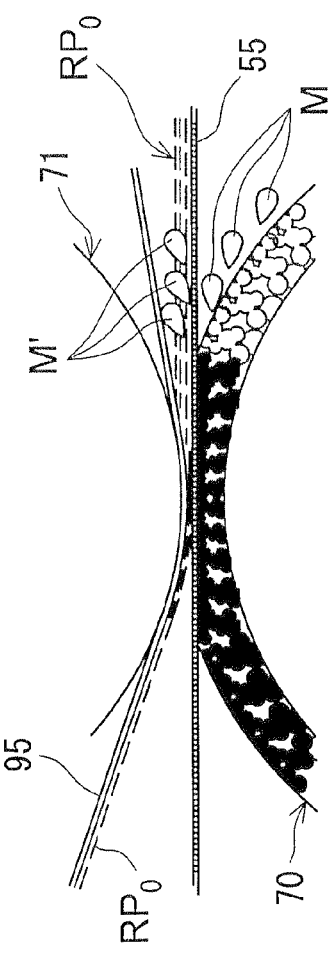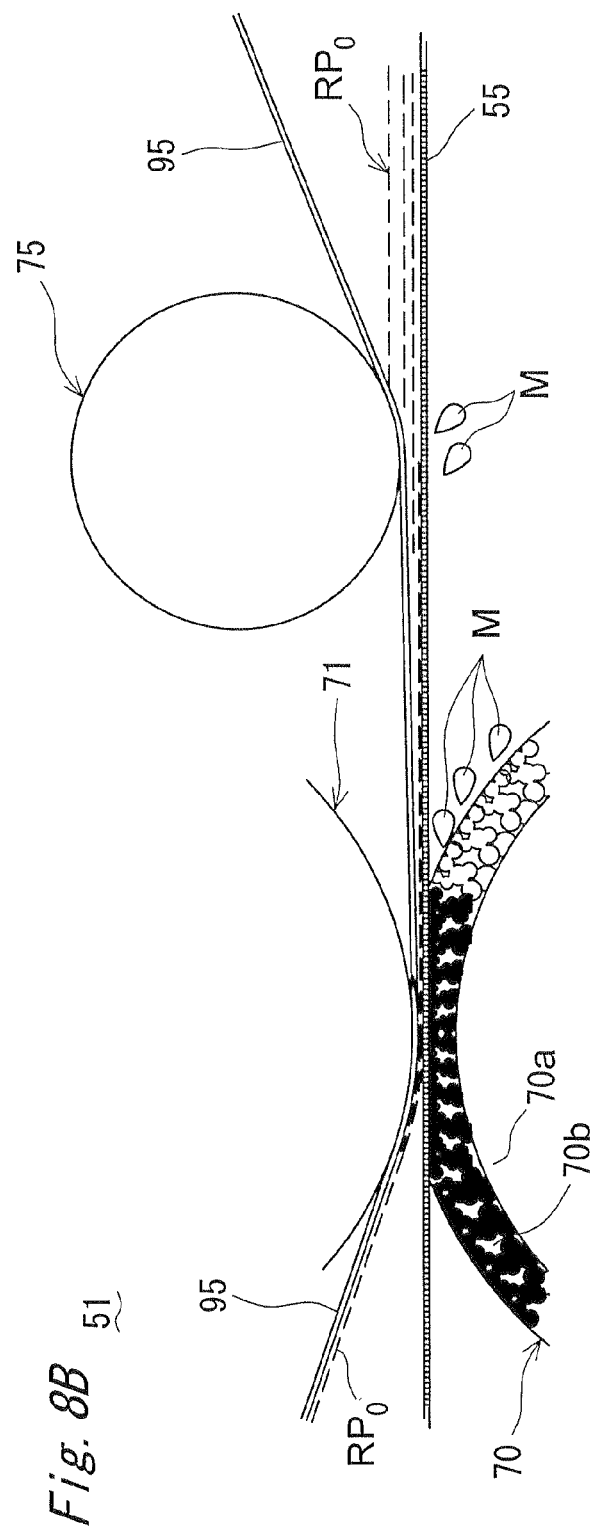

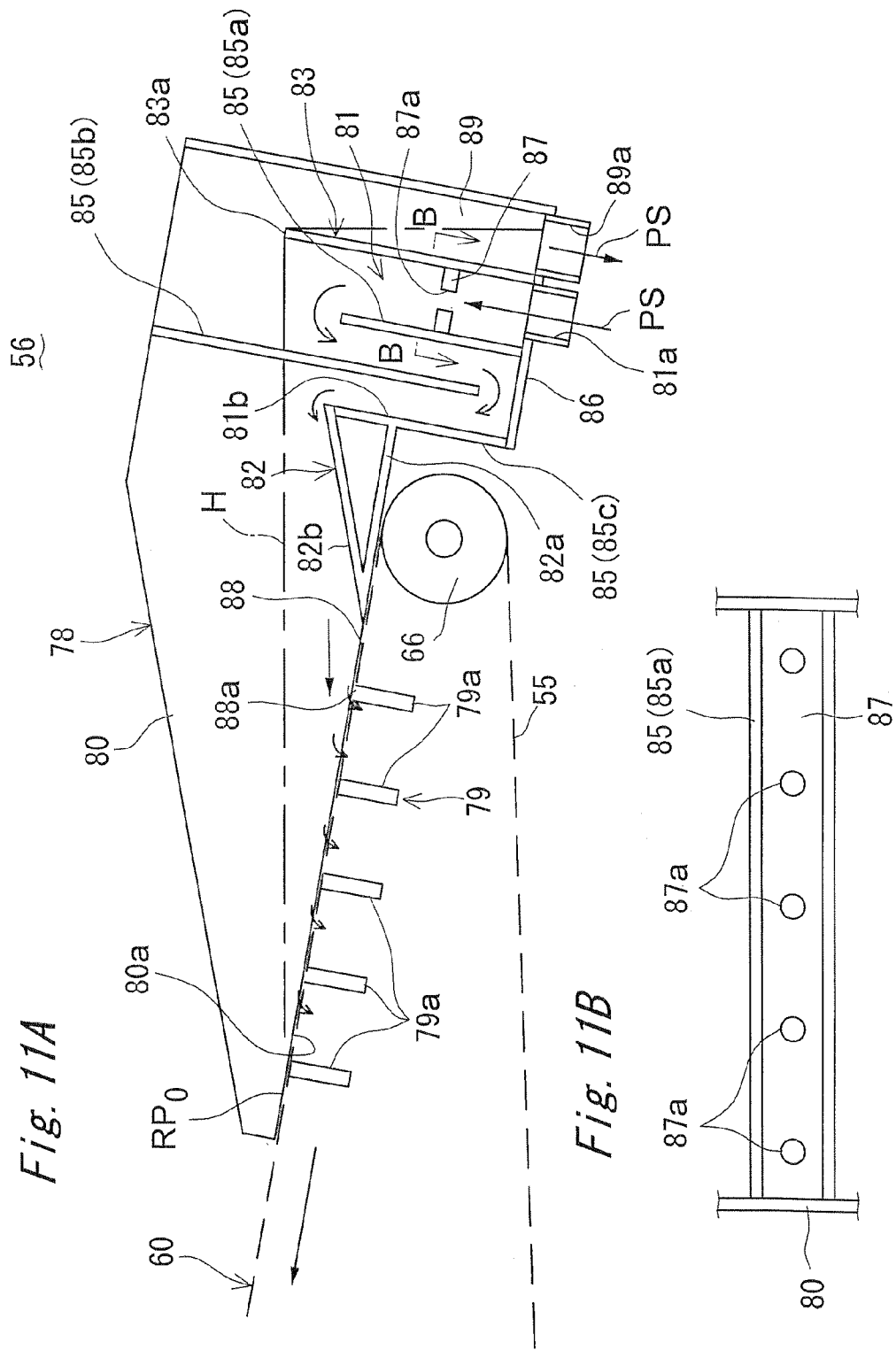

PULP FEEDER FOR USED PAPER RECYCLING APPARATUS

BACKGROUND OF THE INVENTION

1. Field of the Invention

The invention relates to a pulp feeder for used paper recycling apparatus, and more particularly to a pulp feeder for use in a used paper recycling apparatus of furniture size installed at the site of origin of used paper, for recycling and processing into reusable paper at the site without discarding the generated used paper, mainly having a paper making section for manufacturing wet paper from slurry pulp suspension.

2. Description of the Related Art

Used paper of various types occurs not only in government offices or private companies, but also in daily life or general household. Used paper is usually discarded, incinerated, or disposed as refuse.

On the other hand, in the global concern about effective use of limited resources on earth, various technologies have been developed to regenerate and reuse the used paper being disposed and discarded so far.

Such used paper recycling technologies are mostly installed in paper making industry, and the used paper recycling plant requires, like the ordinary paper making plant, a vast land, an immense investment, and a huge quantity of water and chemicals for the purpose of high speed and mass production and high quality of recycled paper.

For recycling of used paper, a tremendous manual labor is needed for collecting used paper, and used paper collection involves various problems, such as mixing of foreign matter by garbage collectors, defective classification due to lack of knowledge about used paper recycling, and entry of harmful objects, and if used paper is collected, in order to recycle by 100 percent, final checking by specialists and cleaning works are needed. On the other hand, confidential documents are not easily recycled and are mostly incinerated, and the recycling rate is low.

To solve these problems of used paper recycling, an effective method is the technology capable of recycling at the site of origin of used paper, and from such point of view, a new system is proposed, for example, in Japanese Patent Application Laid-Open No. H6-134331.

This apparatus is a wet process shredder for shredding used paper into small pieces while adding a small mount of water, and shredded chips from the shredder are sent outside to a recycling plant, and used as material for recycled paper.

Shredded chips from the wet process shredder are deformed into pulp, and are not in the state of piece of paper, and a high confidentiality is guaranteed, and it is expected to promote recycling of confidential documents.

This wet process shredder is a giant machine installed in a wide space, and it can be used only in a large office, and it is not suited to small shop, private office or general household where the space is limited and quantity of used paper is small. If shredded chips may be used as material for recycled paper, processing is possible only in large recycling plant, and the recycling cost is high and it is not economical.

BRIEF SUMMARY OF THE INVENTION

It is a primary object of the invention to present a novel pulp feeder for used paper recycling apparatus capable of solving such conventional problems.

It is other object of the invention to present a pulp feeder for realizing a used paper recycling apparatus of furniture size to be installed not only in a large office, but also in a small shop or a room in general household, friendly to the environment and low in running cost, capable of preventing leak of confidential information, private information, and other information, and keeping a high confidentiality.

It is another object of the invention to present a paper machine having such pulp feeder.

It is a further object of the invention to present a used paper recycling apparatus having such paper machine.

To achieve these objects, the pulp feeder of the invention is used in a used paper recycling apparatus of furniture size small enough to be installed at the site of origin of used paper, forming a pulp feeding section of a paper machine for manufacturing recycled paper from used paper pulp manufactured in pulp making section in a preceding process, and including a partition member disposed slidably at the downside of an endless mesh belt running in the paper making process unit, and a paper making frame body disposed slidably on the upside of the endless mesh belt for defining the supply width of slurry pulp suspension containing water and used paper pulp sent from the pulp manufacturing section, in which the paper making frame body is provided with an overflow gate for keeping constant the water level of the accumulated pulp suspension, and the pulp suspension supplied in the paper making frame body is accumulated up to a specific water level defined by the overflow gate, and is diffused and supplied uniformly on the upside of the endless mesh belt running obliquely upward to the running direction.

Preferred embodiments include the following configurations.

(1) A meandering passage for promoting uniform diffusion of supplied pulp suspension is provided at the downstream side of the overflow gate in the paper making frame body.

(2) The passage meandering vertically is provided in the paper making frame body, and the exit side position of the passage is provided with a flat plate member for covering the mesh cells of the mesh belt in closed state from the upper side, and the pulp suspension supplied in the paper making frame body passes through the meandering passage, and is accumulated up to the specific water level defined by the overflow gate, and is diffused and supplied uniformly on the upside of the endless mesh belt running obliquely upward to the running direction.

(3) The partition member has a louver structure for slidably supporting the downside of the mesh belt.

(4) The passage is formed of a plurality of gate members provided in the paper making frame body.

(5) The plurality of gate members are provided in upright position in the paper making frame body, and the passage is formed in a vertically meandering profile, and the running direction of the passage is extended upward from the inlet, and is also extended upward to the outlet.

(6) Near the inlet of the passage, a partition plate is provided, and the partition plate is provided with a plurality of communication holes opened at specific intervals, and out of the upright gate members installed in the paper making frame body, the upper edges of the gate members forming the partition of changing point from upward direction to downward direction of the passage are formed to be lower than the water level of the pulp suspension staying on the flat plate member.

(7) The flat plate member of the paper making frame body is disposed in an upward gradient in upward slope parallel to the running direction of the mesh belt.

(8) The flat plate member of the paper making frame body is disposed in a downward gradient in downward slope toward the running direction of the mesh belt.

(9) The leading end edge of the flat plate member of the paper making frame body is provided with a thin guide sheet for assuring smooth flow of pulp suspension on the mesh belt, and the leading end edge of this guide sheet is disposed to slide on the upper position of the mesh belt supported by beams forming the louver structure of the partition member.

(10) The paper making frame body is set in the width dimension of the recycled paper to be manufactured in its frame inside width, and defines the supply width of the pulp suspension, and is disposed to slide on the upside of the mesh belt so that the lower end may run obliquely.

The paper machine of the invention has the used paper recycling apparatus of furniture size small enough to be installed at the site of origin of used paper, and is intended to manufacture recycled paper from used paper pulp manufactured in the pulp manufacturing device in preceding process, and includes a paper making process unit for manufacturing wet paper from slurry pulp suspension containing water and used paper pulp sent from the pulp manufacturing device, and this paper making process unit includes a paper making conveyor for manufacturing and conveying pulp suspension, and a pulp feeding section installed at start end position of paper making process of the paper making conveyor, for supplying the pulp suspension from the pulp manufacturing device into the paper making conveyor, and the pulp feeding section is composed of the pulp feeder mentioned above.

A preferred embodiment includes the paper making section unit for manufacturing wet paper from slurry pulp suspension containing water and used paper pulp sent from the pulp manufacturing device, a drying process unit for drying the wet paper manufactured in the paper making section to obtain recycled paper, and a dewatering roll section for squeezing and dewatering the wet paper at the junction of the paper making process unit and drying process unit, in which the pulp suspension supplied from the pulp manufacturing device is processed, and the obtained wet paper is dewatered and dried.

The used paper recycling apparatus of the invention includes, in an apparatus case of furniture size, a pulp manufacturing section for manufacturing used paper pulp by macerating and mashing the used paper, a paper making process unit for manufacturing recycled paper from the used paper pulp manufactured in the pulp manufacturing section, and a control section for driving and controlling by interlocking with the pulp manufacturing section and paper making process unit, in which the paper making process unit is composed of the paper making device.

The pulp feeder of the invention includes a pulp feeding section of paper making device for manufacturing recycled paper from the used paper pulp manufactured in the pulp manufacturing section in preceding process, a partition member disposed slidably on the downside of the endless mesh belt running in the paper making process unit, and a paper making frame body disposed slidably on the upside of the endless mesh belt, for defining the supply width of the slurry pulp suspension containing water and used paper pulp sent from the pulp manufacturing section, in which an overflow gate is provided in the paper making frame body for keeping constant the water level of the accumulated pulp suspension, and the pulp suspension supplied in the paper making frame body is accumulated up to a specific water level defined by the overflow gate, and is diffused and supplied uniformly on the upside of the endless mesh belt running obliquely upward to the running direction, and therefore if the supply amount of pulp suspension sent into the paper making frame body fluctuates, the water level of the pulp suspension collected in the paper making frame body is kept constant, and therefore the weight of the wet paper on the endless mesh belt is stable, and recycled paper of uniform texture is obtained.

The paper machine of the invention having such pulp feeder brings about the following excellent effects, and it can be installed not only in a large office, but also in a small shop, ordinary household and the like, and is friendly to the environment and low in running cost, and capable of preventing leak of confidential information, private information, and other information, and keeping a high confidentiality.

(1) The used paper recycling apparatus includes, in an apparatus case of furniture size, a pulp making section for manufacturing used paper pulp by macerating and mashing used paper, a paper making section (paper making device) for manufacturing recycled paper by making the used paper pulp manufactured in the pulp making section, and therefore without discarding the used paper, the used paper is recycled and reused at the same site of origin, and disposal of used paper is reduced, and refuse problems can be solved, and the limited resources can be utilized effectively.

Hitherto, because of confidential problems, recycling of used paper has not been promoted, but since the used paper can be recycled and reused at the same site of origin, effects of effective utilization of resources are outstanding.

(2) At the site of origin of used paper, a compact used paper recycling system having a same function as large scale system installed in paper making plant or used paper recycling plant is installed, and used paper can be recycled continuously in a closed circuit in a small shop, general household and the like, and refuse collection and transportation expenses and incineration and other costs are saved, and it is very economical.

(3) Moreover, the apparatus structure is compact, and it can be installed not only in large office, but also in small shop, general household and the like, and from this point of view, too, leak of confidential information, private information and the like can be securely prevented.

(4) Being installed at the site of origin of used paper, the used paper is macerated and processed into used paper pulp, and the paper making section manufactures the used paper pulp into recycled paper, therefore the used paper is circulated and used as recycled paper within the site of origin, and information of characters and patterns printed on the paper is not diffused outside of the site of origin of used paper, and leak of confidential information and private information can be prevented securely, and a high confidentiality is guaranteed, and the limited resources can be used effectively.

That is, by using the used paper recycling apparatus having the paper machine of the invention as paper making section, it is free from risk of external diffusion of information from a specific institute (for example, school, hospital, city office, law firm, patent office, general household).

In other words, in the case of a conventional shredder, if the used paper is shredded into small chips, and the printed characters and patterns are not legible, the shredded chips are incinerated, and external diffusion cannot be prevented perfectly. In this regard, the waste chips may be stored within an internal warehouse for preventing external diffusion, but storing place is needed, and the resources are used only once and are not utilized effectively.

By contrast, according to the used paper recycling apparatus of the invention, the information printed on the used paper is not diffused outside of the closed system, and the resources can be utilized effectively.

These and other features and objects of the invention will be more clearly appreciated and understood from the following detailed description given together with the accompanying drawings and novel facts disclosed in the claims.

BRIEF DESCRIPTION OF THE DRAWINGS

FIG. 8A is a block diagram of specific mechanism of squeezing and dewatering of dewatering roll section in the paper making section, showing a basic squeezing and dewatering mechanism.

FIG. 8B is a block diagram of specific mechanism of squeezing and dewatering of dewatering roll section in the paper making section, showing a squeezing and dewatering mechanism when the slurry preventive roll is provided near the upstream side of the dewatering roll section.

FIG. 11A is a front sectional view of the pulp feeding section.

FIG. 11B is a sectional view along line B-B in FIG. 11A, showing a structure of the pulp feeding section.

DETAILED DESCRIPTION OF THE PREFERRED EMBODIMENTS

Figure 1:
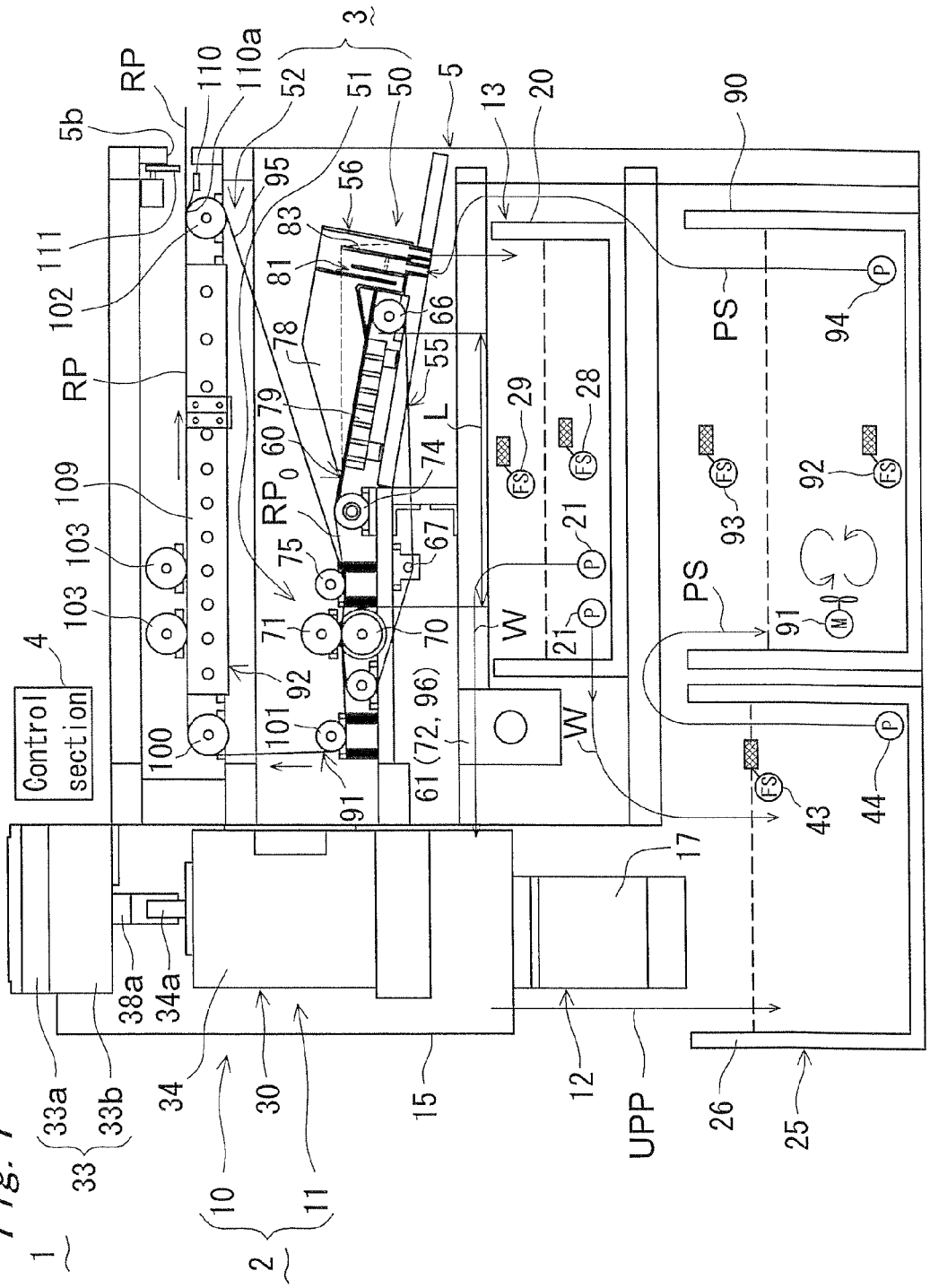
FIG. 1 is a front view of entire structure of the used paper recycling apparatus in preferred embodiment 1 of the invention, showing a cut-away view of apparatus case.

Preferred embodiments of the invention are specifically described below while referring to the accompanying drawings. Throughout the drawings, same parts or elements are identified with same reference numerals.

Preferred Embodiment 1

A used paper recycling apparatus of the invention is shown in FIG. 1 to FIG. 9, and this used paper recycling apparatus 1 is specifically installed at the site of origin of used paper, and it is an apparatus for manufacturing recycled paper at the site without disposing or discarding the used paper UP, and such used paper UP includes confidential documents occurring in government offices and private companies, and private letters in general household, and other used and unnecessary documents.

Figure 9:
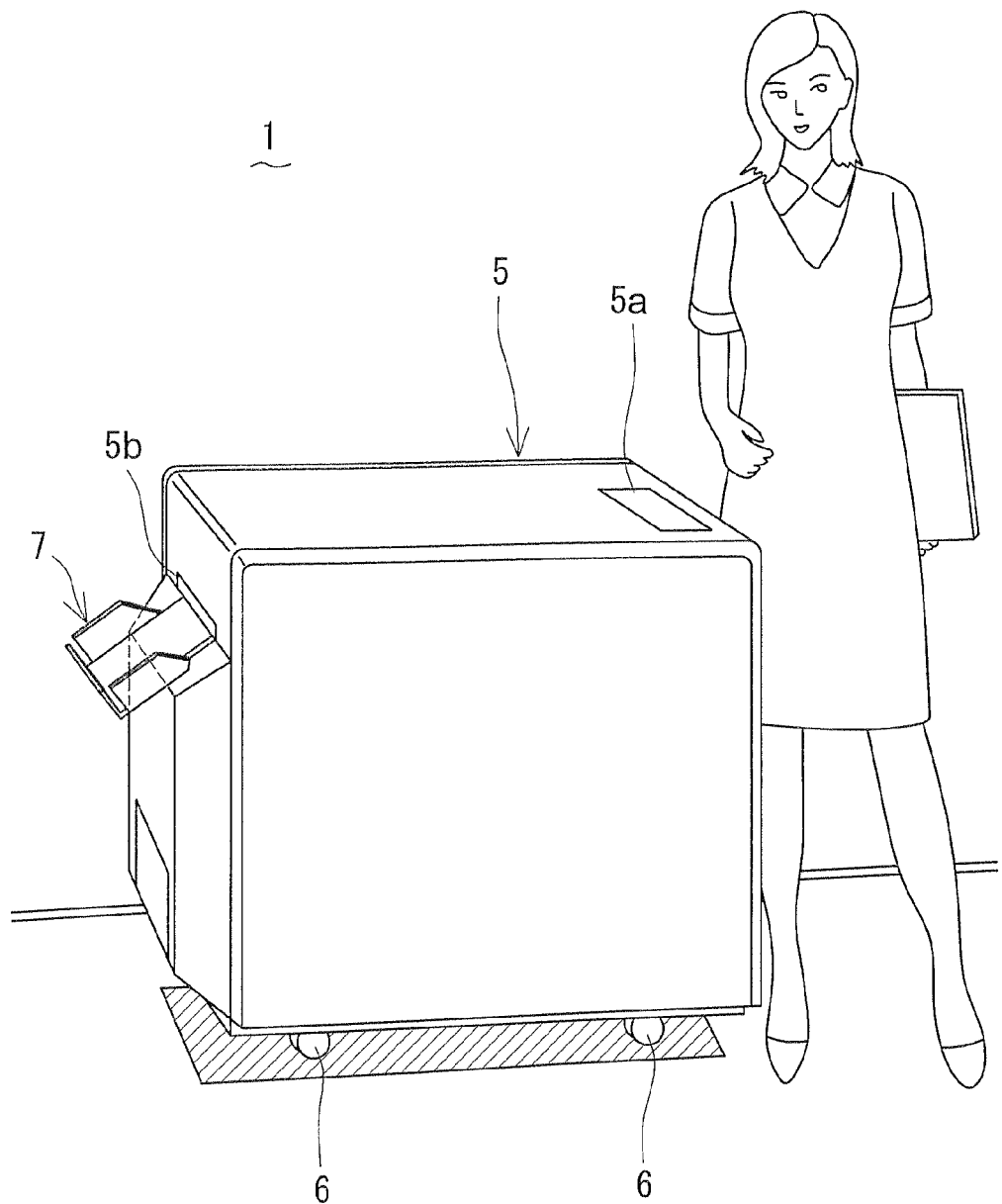
FIG. 9 is a perspective view of appearance of used paper recycling apparatus of the invention.

The used paper recycling apparatus 1 has a furniture size as shown in FIG. 9, that is, size and shape similar to office equipment, such as document rack, locker, desk, copier, or personal computer, and is mainly composed of a pulp making section 2, a paper making section (paper making device) 3, and a control section 4 as shown in FIG. 1, and these sections 2 to 4 are contained in an apparatus case 5 in a compact design, and a drive source of the pulp making section 2 and paper making section 3 is a drive source driven by a general household alternating-current power source.

The apparatus case 5 has a furniture size as mentioned above, and the specific dimensions and shape are designed properly depending on the purpose and application. The apparatus case 5 in the illustrated preferred embodiment is a box in the shape of substantially rectangular parallelepiped having dimensions and shape like a copier used in an office, and in the bottom, casters 6, 6, . . . are provided as moving means so as to be moved freely on the floor. In the ceiling of the apparatus case 5, an inlet 5a is provided for supplying used paper UP, and a detachable recycled paper receive tray 7 is provided in the side surface for receiving recycled paper RP, RP . . . . A discharge port 5b of the apparatus case 5 is provided oppositely to the recycled paper receive tray 7, and recycled paper RP, RP, . . . discharged from the discharge port 5b are received sequentially in layers.

The pulp making section (pulp manufacturing apparatus) 2 is a process unit for manufacturing used paper pulp by macerating and mashing used paper UP, and is composed of a macerating unit 10 for agitating, grinding, and macerating the used paper UP, and a mashing unit 11 for mashing the used paper UP macerated in the macerating unit 10, and in the illustrated preferred embodiment, the macerating unit 10 and mashing unit 11 circulate the used paper UP for a specified time.

The macerating unit 10 includes an agitating device 12 for agitating the used paper UP, and a water feeding unit 13 for supplying water into the agitating device 12.

Figure 2:
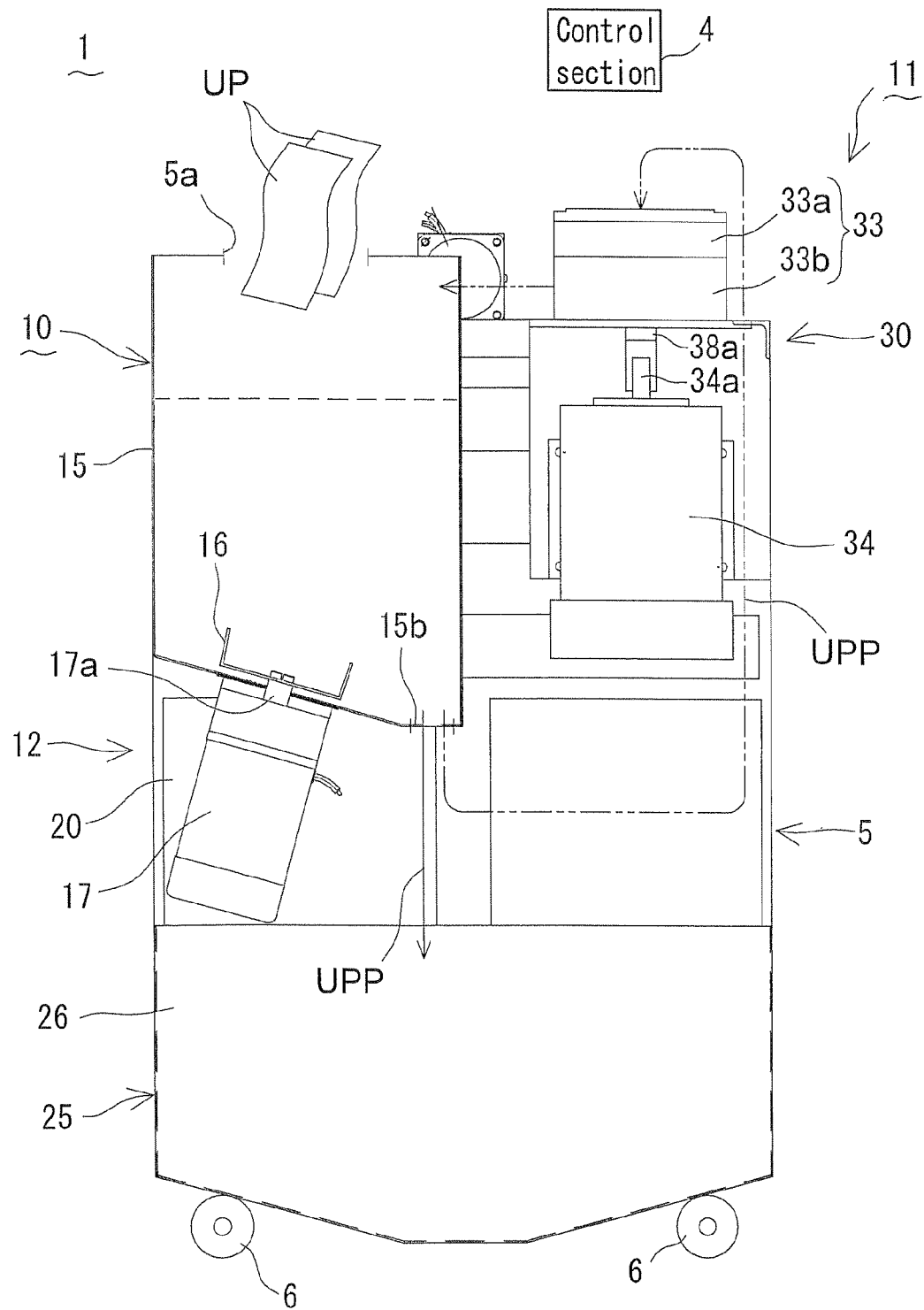
FIG. 2 is a side view of entire structure of the used paper recycling apparatus, showing a cut-away view of apparatus case.

The agitating device 12 includes an agitating tank 15, an agitating impeller 16, and a drive motor 17. The agitating tank 15 is shown in FIG. 2, in which a closable inlet 5a is provided outside of the apparatus case 5 in the ceiling wall, and an agitating impeller 16 is rotatably provided in the inside. The inner volume of the agitating tank 15 is determined depending on the number of sheets of used paper UP to be agitated in batch. In the illustrated preferred embodiment, the agitating tank 15 is supposed to agitate about 8 sheets (about 32 g) of used paper UP of A4 format plain paper copier (PPC) in batch process by adding about 1.5 liters of water.

The agitating impeller 16 is provided in an inclined bottom of the agitating tank 15, and is driven by and coupled to a rotary shaft 17a (12a) of the drive motor 17, and is rotated normally and reversely by the drive motor 17 continuously or intermittently. The drive motor 17 is specifically an electric motor, and the drive motor 17 is electrically connected to the control section 4.

When the agitating impeller 16 is rotated normally and reversely, the used paper UP, if agitated in the size of A4 format, is effectively dispersed by the jet action of water by normal rotation followed by reverse rotation of the agitating impeller 16, and entangling on the agitating impeller 16 can be effectively prevented, and therefore the used paper UP, UP, . . . can be uniformly macerated and mashed.

The water feed section 13 is composed of white water collect tank 20 and water feed pump 21 as shown in FIG. 1. The white water collect tank 20 is designed to collect white water W filtered and dewatered in the paper making section 3 (pulp water of ultralow concentration filtered by the paper making mesh in the paper making process), and the white water W collected in the white water collect tank 20 is supplied as water for agitation into the agitation tank 15 of the agitating device 12 by the water feed pump 21.

The water feed section 13 also functions, as described below, as concentration adjusting water feeding means of pulp concentration adjusting device 25, and for this purpose, moreover, a concentration adjusting water feed pump 27 is provided for supplying the white water W in white water collect tank 20 into the concentration adjusting tank 26 as water for adjusting the concentration. Reference numerals 28 and 29 are respectively lower limit water level float switch and upper limit water level float switch provided in the white water collect tank 20.

In the agitating device 12, the used paper UP, UP, . . . supplied into the agitating tank 15 from the opening or inlet 5a of the apparatus case 5 is agitated for a specific time (3 to 5 minutes in the shown case) in water W supplied from the water feed section 13 by normal and reverse rotation of the agitating impeller 16 by the drive motor 17, and macerated and mashed, and transformed into used paper pulp UPP.

The mashing unit 11 has at least one mashing machine, or one mashing machine 30 is shown in the illustrated preferred embodiment.

The mashing machine 30 pressurizes and mashes the used paper UP macerated in the macerating unit 10, and grinds and pulverizes the inks forming characters and patterns on the used paper UP.

The mashing machine 30 is mainly composed of a plurality of (two in this case) relatively moving mashing members 31, 32 disposed oppositely across a tiny mashing clearance, and specifically includes a mashing tank 33 communicating with the agitating tank 15 of the macerating unit 10, the mashing members 31, 32 provided relatively movably in the mashing tank 33, and a drive source 34 for driving the mashing members 31, 32 relatively.

In the shown mashing machine 30, the mashing members 31, 32 are relatively moving disks, and more specifically the upper mashing member 31 is fixed, and the lower mashing member 32 is rotatable.

The mashing tank 33 has an upper and lower divided structure so as to contain the pair of mashing members 31, 32 in a closed cylindrical shape, with the upper tank 33a and lower tank 33b mutually engaged. The mashing tank 33 has a feed port 35 opened in the center of the ceiling of the upper tank 33a, and a discharge port 36 opened in the cylindrical side of the lower tank 33b, and the feed port 35 and discharge port 36 are connected to communicate with the agitating tank 15 of the macerating tank 10 by way of piping not shown. Although not shown specifically, the feed port 35 communicates with the bottom position of the agitating tank 15, and the discharge port 36 communicates with the upper position of the agitating tank 15.

The upper fixed side mashing member 31 is fixed to the ceiling inner side of the upper tank 33a by proper fixing means, and the lower rotatable mashing member 32 is provided oppositely to the fixed side mashing member 31 concentrically across a tiny mashing clearance A.

The rotatable mashing member 32 provided integrally on a rotary bench 38, and a rotary support shaft 38a of the rotary bench 38 is opposite to the outside of the mashing tank 33 by way of the opening 37 in the bottom center in the bottom of the mashing tank 33, and is directly fixed to the rotary shaft 34a of the drive motor 34 as the rotary drive source in a direct motor structure. This drive motor 34 is specifically an electric motor, and the drive motor 34 is electrically connected to the control section 4.

Figure 3:
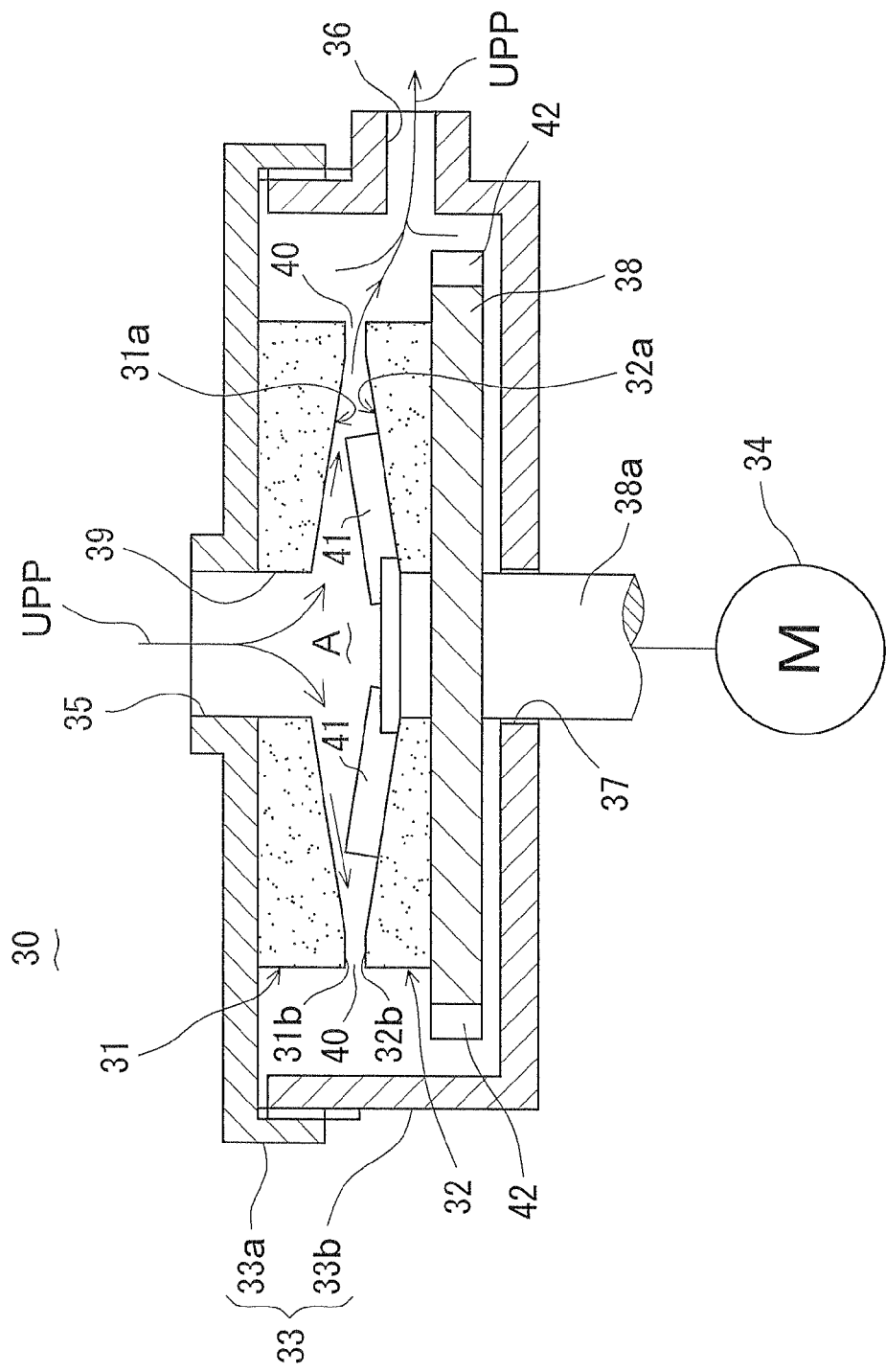
FIG. 3 is a front sectional view showing essential parts of mashing unit of pulp making section in the used paper recycling apparatus.

The opposite sides 31a, 32a of both mashing members 31, 32 forming the tiny mashing clearance A cooperate and form mashing action surfaces. These opposite mashing action surfaces 31a, 32a are grindstone surfaces having multiple abrasive grains coupled by a binding material, and these two mashing action surfaces 31a, 32a are formed in a taper shape gradually increased in diameter toward the mutually opposite directions as shown in FIG. 3, and the mashing clearance A of conical shape is formed between them.

In the central position of mashing action surface 31a of the fixed side mashing member 31, an inlet 39 is formed to communicate concentrically with the feed port 35 of the mashing tank 33, and an annular clearance 40 formed between outer peripheral edges 31b, 32b of mashing action surfaces 31a, 32a of the two mashing members 31, 32 is formed as an outlet communicating with the discharge port 36 of the mashing tank 33.

In this relation, a plurality of guide ribs 41, 41, . . . are provided in the mashing action surface 32a of the rotary mashing member 32 at equal intervals in the circumferential direction, and a plurality of blades 42, 42, . . . are provided on the outer circumference of the rotary bench 38 for supporting the rotary mashing member 32 at predetermined or equal intervals in the circumferential direction.

By rotation of the rotary mashing member 32, the plurality of guide ribs 41, 41, . . . act to guide the used paper pulp UPP flowing into the mashing clearance A from the inlet 39 into the outlet 40, and the plurality of blades 42, 42, . . . act as pump for forcing out the used paper pulp UPP flowing in from the outlet 40 toward the discharge port 36 of the mashing tank 33 by centrifugal force.

The gap of the mashing clearance A is set at about 0.05 to 0.8 mm. The gap of the mashing clearance A can be finely adjusted by relatively rotating the upper tank 33a and lower tank 33b of the mashing tank 33, and moving back and forth the engaged portion. As the gap of the mashing clearance A is finely adjusted depending on the purpose, and high pressure and sliding force depending on the strength and driving force of the apparatus mechanical structure can be obtained in the cooperating action of the mashing action surfaces 31a, 32a. Also by adjusting the gap of the mashing clearance A, the mashing speed of the mashing unit 11 (mashing time) can be also adjusted properly.

In the state of the rotary mashing member 32 rotated and driven on the fixed mashing member 31 by the drive motor 34, the used paper pulp UPP supplied into the feed port 35 of the mashing tank 33 from the agitating tank 15 of the macerating unit 10 flows into the mashing clearance A from the inlet 39, passes through the mashing clearance A, receives the pressurizing and mashing action by the mashing action surfaces 31a, 32a rotating relatively, while inks forming characters and patterns on the used paper UP are pulverized, and returns to the agitating tank 15 from the outlet 40 by way of the discharge port 36 of the mashing tank 33 (see the flow path indicated by arrow in FIG. 3).

The feed port 35 and discharge port 36 of the mashing tank 33 are opened and closed by opening means. Specific structure of opening means is not shown, but any conventional manual or automatic opening valve may be used. The opening valve closes the feed port 35 and discharge port 36 when the operation of the mashing unit 11 is stopped, thereby preventing entry of used paper UP or used paper pulp UPP into the mashing tank 33 from the agitating tank 15 of the agitating device 12, and opens the feed port 35 and discharge port 36 when the operation of the mashing unit 11 is started, thereby allowing circulation of used paper UP or used paper pulp UPP between the agitating tank 15 and the mashing tank 33.

In this case, when the macerating unit 10 and mashing unit 11 are driven at the same time, the mashing tank 33 constitutes a pulp circulation tank for allowing circulation of used paper pulp UPP together with the agitating tank 15 of the macerating unit 10, and the used paper pulp UPP flowing and circulating through the circulation tanks 10, 23 receives the agitating and maceration action by the macerating unit 10, and the pressurizing and mashing action and ink grinding and pulverizing action by the mashing unit 11 sequentially and repeatedly. As a result, an appropriate paper strength is obtained for recycled paper RP to be made and regenerated in the paper making section 3 in a later process, and a recycled paper RP of high degree of whiteness is obtained (same effect as in de-inking process).

The pulp concentration adjusting unit 25 is provided at the downstream side of the agitating tank 15, and is designed for properly adjusting the concentration of used paper pulp UPP manufactured in the agitating tank 15 to be suited to subsequent paper making process. The pulp concentration adjusting unit 25 includes a concentration adjusting tank 26 for storing the used paper pulp UPP manufactured in the agitating tank 15, and a concentration adjusting water feed unit for supplying water into the concentration adjusting tank 26, and the water feed unit 13 functions also as the concentration adjusting water feed unit as mentioned above.

The inner volume of the concentration adjusting tank 26 is determined depending on the number of sheets (weight) of used paper UP to be processed in batch in the agitating device 12. In the illustrated preferred embodiment, the concentration adjusting tank 26 is supposed to have a volume enough to adjust the concentration of used paper pulp UPP corresponding to the capacity of batch processing of about 8 sheets (about 32 g) of used paper UP of A4 format as stated above.

In this relation, a drain port 15b is provided in the bottom of the agitating tank 15 of the agitating device 12, and the drain port 15b is opened and closed by drain valve not shown in the drawing. The drain valve is specifically an electromagnetic valve, and is electrically connected to the drive section 4.

A specific concentration adjusting method of the pulp concentration adjusting unit 25 is explained. In the concentration adjusting tank 26, water W is added from the concentration adjusting water feed unit 13 to the whole volume of used paper pulp UPP manufactured in batch process in the agitating tank 15, until the total volume of used paper pulp UPP and water W becomes a specified amount, and pulp suspension PS of specified concentration is prepared. The target concentration of the pulp suspension PS to be adjusted is determined in consideration of paper making capacity of the paper making section 3 specified below, on the basis of the data of preliminary experiments, and it is set at concentration of about 0.1% in the shown example. Reference numeral 43 is a float switch provided in the concentration adjusting tank 26, and it detects the water level when the amount of pulp suspension PS in the concentration adjusting tank 26 (total volume of used paper pulp UPP and water W) becomes the specified amount.

Therefore, in the concentration adjusting tank 26, the whole volume of used paper pulp UPP manufactured in the agitating tank 15 (and mashing tank 33) is dropped and supplied by gravity into the concentration adjusting tank 26 from the drain port 15b of the agitating tank 15, and white water W added to the used paper pulp UPP from the concentration adjusting water feed unit 13 up to the specified value (detected by the float switch 43), and the concentration of the used paper pulp UPP is adjusted, and pulp suspension PS of specified concentration is obtained.

In the illustrated preferred embodiment, in the whole volume of used paper pulp UPP (about 32 g of used paper UP+1.5 liters of water W), water W for dilution is added from the concentration adjusting feed unit 13, and it is controlled so that the total volume (total weight) of used paper pulp UPP and water W may be 32 liters, and pulp suspension of concentration of about 0.1% (target concentration) is prepared. This pulp suspension PS of adjusted concentration is sent into pulp feed tank 90 of paper making section 3 in next process by means of first suspension feed pump 44.

While the used paper pulp UPP is dropped and supplied into the concentration adjusting tank 26 from the drain port 15b of the agitating tank 15, water W is supplied by water feed pump 21 from the water feed unit 13, and the agitating impeller 16 is rotated by the drive motor 17, and the inside of the agitating tank 15 is cleaned.

The water feed source of the water feed unit 13 is the white water W dewatered in the paper making section 3 collected in the white water collect tank 20, and, in other words, the hole white water W dewatered and collected in the paper making section 3 is circulated and reused in the agitating device 12 of the macerating unit 10 and pulp concentration adjusting unit 25.

The paper making section (paper making device) 3 is a process unit for manufacturing recycled paper RP from the used paper pulp UPP manufactured in the mashing unit 10, and includes a paper making process unit 50, a dewatering roll section 51, and a drying process unit 52.

The paper making section 3 is the most important part of the used paper recycling apparatus 1, and its components 50 to 52 have the following excellent features in order to realize paper making process for manufacturing recycled paper which was conventionally possible only in a large plant for recycling used paper, within an apparatus case 5 of size and shape of copier (furniture size) used in a small space in an office or the like.

The paper making process unit 50 is a location for manufacturing wet paper from slurry pulp suspension PS of water W and used paper pulp UPP sent from the mashing unit 10 of the pulp making section 2, and mainly includes a paper making conveyor 55, and a pulp feed unit (pulp feed device) 56.

The paper making conveyor 55 is for conveying the pulp suspension PS while processing, and is specifically a mesh belt 60 of paper making mesh structure of numerous mesh cells for filtering and dewatering the pulp suspension, being disposed to run straightly toward its running direction.

Specifically, the paper making mesh conveyor 55 includes the mesh belt 60 of endless belt for manufacturing and conveying the pulp suspension PS, and a drive motor 61 for driving this mesh belt 60.

The mesh belt 60 is specifically an endless belt having plate members of paper making mesh structure of specified width connected in a ring form of specified length.

The plate members of paper making mesh structure of this mesh belt 60 are made of materials capable of filtering and dewatering the pulp suspension PS appropriately through innumerable mesh cells of paper making mesh structure, and preferred examples include polypropylene (PP), polyethylene terephthalate (PET), polyamide (PA) (generally known by the registered trade name of Nylon), and stainless steel (SUS), and other materials excellent in corrosion resistance, and in the illustrated preferred embodiment, the mesh belt 60 is made of PET excellent in heat resistance.

The paper making mesh structure of the mesh belt 60 is preferred to be fine in mesh size, or fine and smooth in woven texture, and especially the following points are taken into consideration depending on the properties of the paper.

(1) Mesh Size of Mesh Belt 60

The mesh size of mesh belt 60 is preferably 25 meshes to 80 meshes, and the mesh belt 60 of 50 meshes is used in the illustrated preferred embodiment.

(2) Wire Diameter of Mesh of Mesh Belt 60

The mesh of the mesh belt 60 is defined not only by the number of mesh cells (size), but also by the wire diameter of the mesh. If the number of mesh cells is the same, in a thick wire diameter, the mesh size is smaller, and in a thin wire diameter, the size is larger, and it is expressed by the voids of the mesh, or permeability for passing the air ($cm^3/cm^2/sec$).

If the mesh size is fine and the permeability is poor, water filtering rate is also low, and a paper making frame body 78 of the pulp feed unit 56 is extended in the running direction of mesh belt 60 as described below, and the apparatus is increased in size. To the contrary, if the mesh is coarse and the permeability is too high, the paper making frame body 78 is shorter and the apparatus size is smaller, but the regenerated recycled paper PP is rough in texture, and the smoothness difference between obverse and reverse sides of the paper is large, and the paper smoothness is poor.

(3) Woven Structure

Weaving methods of meshes of the mesh belt 60 include single weaving, double weaving, and changing of warp diameter and weft diameter, but in multiple weaving, however, since the roll diameter for supporting the rotation of the mesh belt 60 is increased and the apparatus size is increased, and hence the mesh belt 60 of single weaving is used in the illustrated preferred embodiment.

Considering these conditions, the mesh belt 60 is desired to be a reticular structure fine in wire diameter of mesh, large in the number of mesh cells, and high in permeability, so as to prevent the used paper pulp UPP from being slipping out of the meshes of the mesh belt 60 in the paper making process, and the mesh belt 60 in the illustrated preferred embodiment is a plain-woven PET mesh belt 60 of 50 meshes. By using this mesh belt 60, it has been experimentally known that a high paper quality favorable for writing is obtained.

The width dimension of the mesh belt 60 is set at a specified width slightly larger than the width dimension of the recycled paper RP to be manufactured from the pulp suspension PS.

Figure 4:
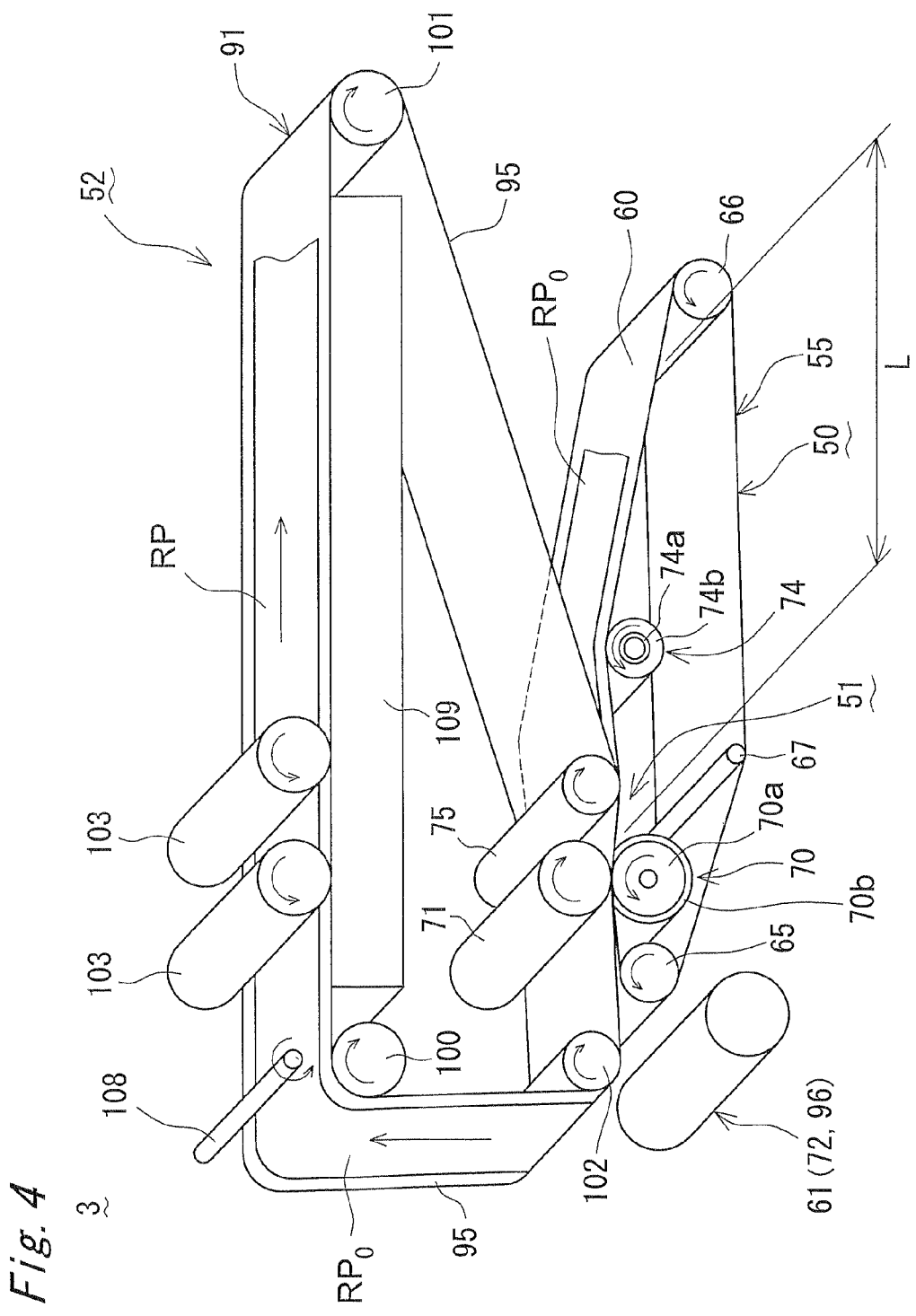
FIG. 4 is a perspective view of outline structure of paper making section of the used paper recycling apparatus.
Figure 5:
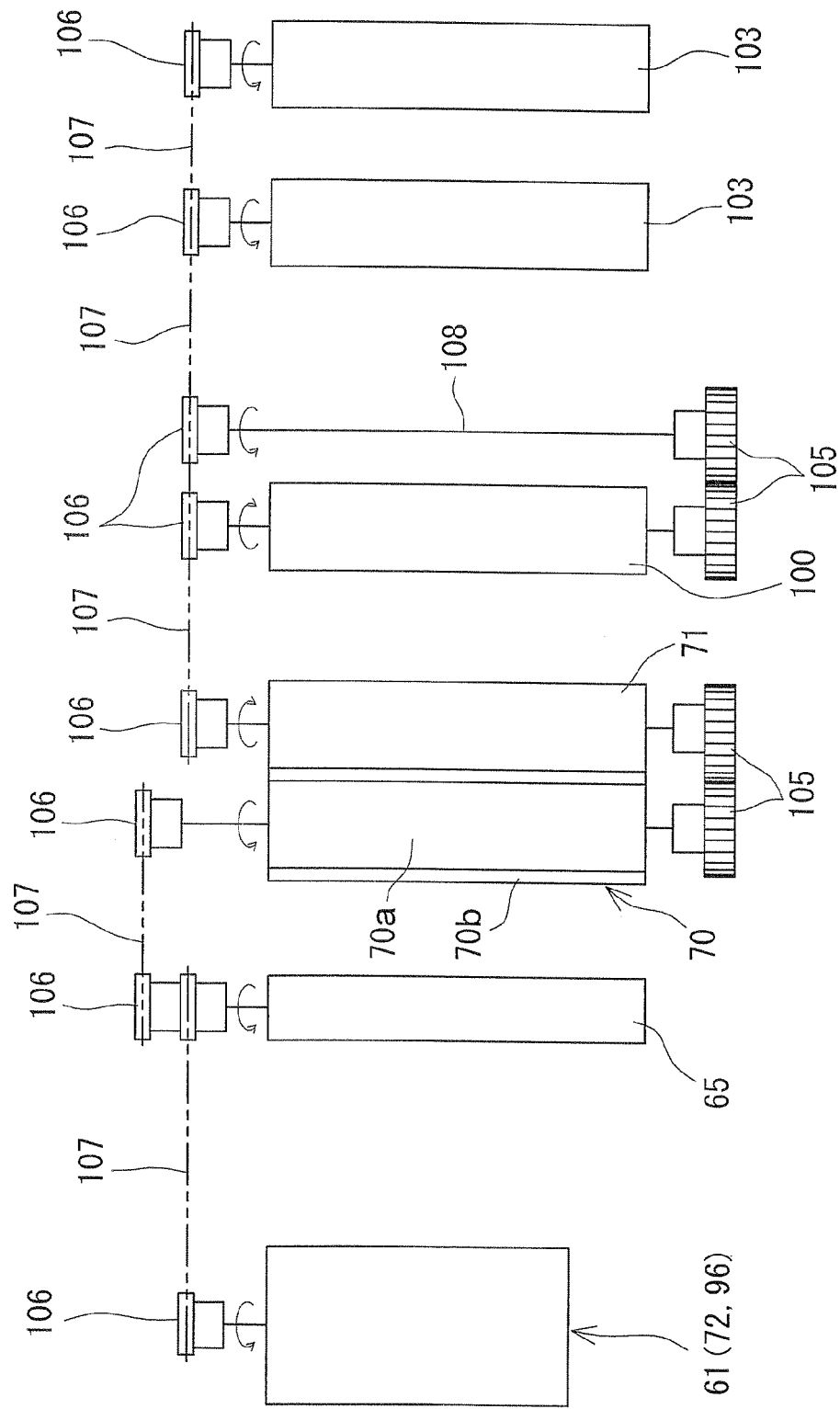
FIG. 5 is a plan view of drive coupling mechanism in the paper making section.

The mesh belt 60 is rotatably suspended and supported, as shown in FIG. 1 and FIG. 4, by way of drive roller 65, follower roller 66, support roller 67, dewatering roll 70, and preliminary dewatering roll 74, and is driven by and coupled to the drive motor 61 through the drive roller 65.

The paper making process length L in the mesh belt 60 is determined in a range of linear running direction length of mesh belt 60 (lateral direction length in FIG. 1 and FIG. 4) in the apparatus case 5 of furniture size.

Specifically, the paper making process length L in the mesh belt 60 is set to be sufficient for manufacturing the pulp suspension PS in a proper weight in relation to the filtering and dewatering rate of the paper making mesh structure and the running speed of mesh belt 60, and appropriate for accommodating the paper making conveyor 55 having the mesh belt 60 in the apparatus case 5 of furniture size.

The running speed of the mesh belt 60 is determined in consideration of the above conditions, and is preferably set at about 0.1 m/min to 1 m/min, and it is set at 0.2 m/min in this illustrated preferred embodiment. Incidentally, in the conventional large-scale used paper recycling plant and so on, the running speed of such mesh belt is at least 100 m/min, or more than 1000 m/min in faster version.

The running speed of the mesh belt 60 is related to the weight of wet paper in the paper making process, and the weight increases when the running speed of the mesh belt 60 declines, and the weight decreases when the running speed picks up. In this case, the mashing rate of used paper pulp UPP is related to the filtering of the mesh belt 60, and a constant weight is obtained if the mashing degree and pulp concentration are constant.

The drive motor 61 for driving the mesh belt 60 is specifically an electric motor, and is connected electrically to the control section 4. The drive motor 61 is also used as drive source of dewatering roll section 51 and drying process unit 42 described below, and the structure for common used or the drive coupling mechanism is mentioned below.

The pulp feed unit (pulp feed device) 56 is a location for supplying pulp suspension PS from the mashing unit 10 of the pulp making section 2 onto the mesh belt 60, being provided at start end position of paper making process of paper making conveyor 55, and specifically the pulp feed unit 56 supplies and spreads the pulp suspension PS uniformly on the upper surface of the mesh belt 60.

Figure 6:
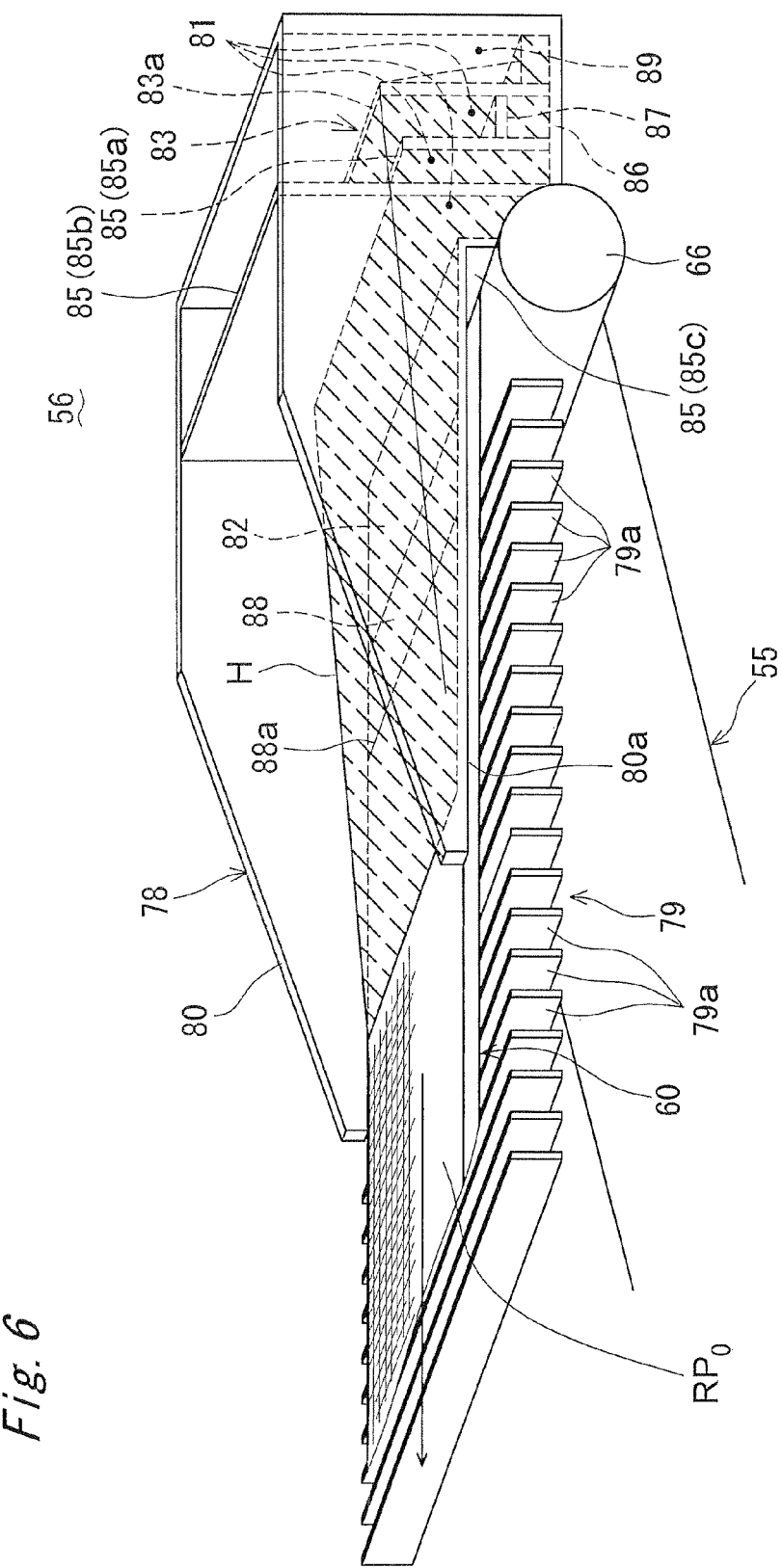
FIG. 6 is a magnified perspective view of pulp feeding section in the paper making section.
Figures 7A, 7B:
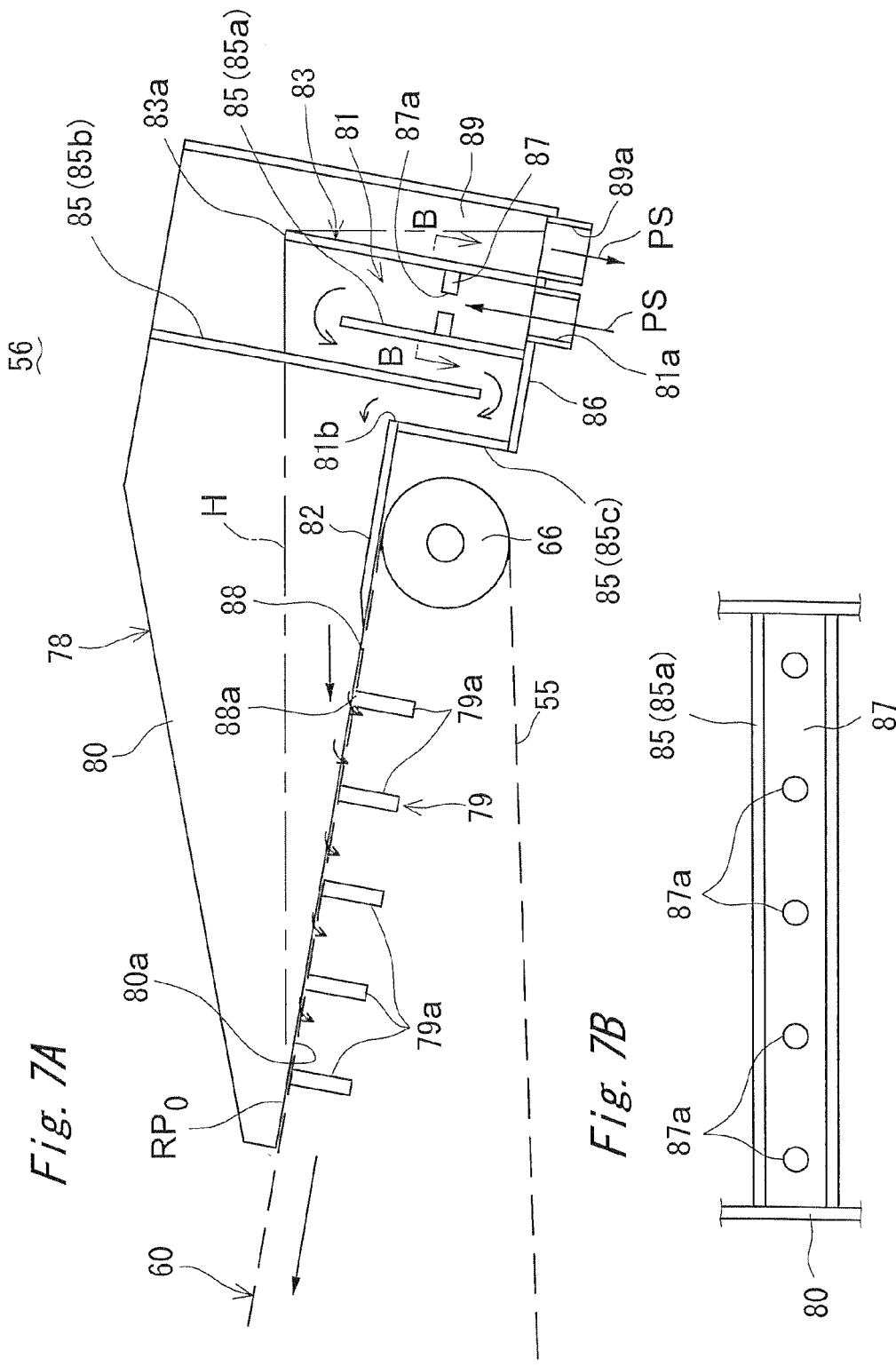
FIG. 7A is a front sectional view of the pulp feeding section.
FIG. 7B is a sectional view along line B-B in FIG. 7A, showing a structure of the pulp feeding section.

A specific structure of the pulp feed unit 56 is shown in FIG. 6, FIG. 7A and FIG. 7B. In this pulp feed unit 56, the mesh belt 60 is disposed in an upward slope toward the running direction, and a paper making frame body 78 and a partition member 79 are disposed at upper and lower side positions of the mesh belt 60.

The paper making frame body 78 is slidably disposed on the upside of the mesh belt 60 for defining the supply width of pulp suspension PS sent from the pulp making section 2, and, as shown in FIG. 6, FIG. 7A and FIG. 7B, includes a main body frame 80, a passage 81 provided inside of the main body frame 80, a flat plate member 82 provided at the outlet side position of the passage 81, and an overflow gate 83 provided at the rear end of the main body frame 80.

The main body frame 80 has a flat U-shape, opened at the leading end, that is, the running direction side end portion of the mesh belt 60, and is disposed so that its lower end 80a may slide on the upside of the mesh belt 60 running obliquely, and the frame inner width of main body frame 80 is set in a width dimension of recycled paper RP to be manufactured.

The passage 81 is a meandering passage for promoting uniform dispersion of the supplied pulp suspension PS, and is provided at the downstream side of the overflow gate 83 in the paper making frame body 78.

Specifically, the passage 81 is mainly composed of a plurality of gate members 85, 85, . . . provided in the main body frame 80, and in the shown preferred embodiment, the passage 81 is formed of a bottom plate 86 forming the bottom of the main body frame 80, and three gate members 85a, 85b, 85c provided in upright position in the main body frame 80, and overflow gate 83.

Specifically, as shown in FIG. 7A, the three gate members 85a, 85b, 85c and the overflow gate 83 are disposed upright and parallel at specified equal intervals in the main body frame 80, and the passage 81 is formed and bent in vertical direction, and the running direction of the passage 81 is formed to extend in upward direction from its inlet 81a, that is, the opening formed in the bottom plate 86, and extend in upward direction to its outlet 81b (see arrow in FIG. 7A). The inlet 81a communicates with the pulp feed tank 90 for supplying the pulp suspension PS.

The assembly structure of gate members 83, 85a, 85b, 85c, 86 and main body frame 80 for forming the passage 81 is may be composed of separate members connected and assembled integrally as in the illustrated preferred embodiment, or may be formed integrally from plastic materials or other materials to be formed integrally by injection forming or other process.

Of the gate members 85a, 85b, 85c provided upright in the main body frame 80, the gate member forming the partition changing from upward to downward direction of the passage 81, that is, the upper edge of the gate member 85a in the preferred embodiment is set to be positioned lower than the level of pulp suspension PS flowing and staying on the flat plate member 82, that is, lower than the level H defined by the overflow gate 83.

Near the inlet 81a of the passage 81, a partition plate 87 is provided to divide the passage 81, and this partition plate 87 is provided with a plurality of communication holes 87a, 87a, . . . opened at specified intervals as shown in FIG. 7B.

The flat plate member 82 is provided at the side the outlet 81b of the passage 81, and covers the mesh cells of the mesh belt 60 in closed state from the upper side. This flat plate member 82 is set in an upward gradient in an upward slope parallel toward the running direction of the mesh belt 60.

In this relation, the partition member 79 has a draining louver structure composed of a plurality of framework members 79a, 79a, . . . , having a shape and size capable of slidably supporting the entire width of the downside of the mesh belt 60.

At the leading end edge of the flat plate member 82, a thin guide sheet 88 is provided for assuring smooth flow of pulp suspension on the mesh belt 60. The leading end edge 88a of the guide sheet 88 is set at a position corresponding to each one of the framework members 79a, 79a, . . . , that is, the beams for forming the louver structure of the partition member 79 (the final beam 79a in the preferred embodiment), and is specifically disposed to slide on the upper position of the mesh belt 60 supported by this beam 79a.

The overflow gate 83 is provided, as stated above, to keep constant the water level H of the pulp suspension PS accumulated in the paper making frame body 78, and its upper end edge 83a is formed in a horizontal straight line, and its height position is set depending on the conditions of the mesh belt 60 as mentioned above so that the weight of the wet paper $RP_0$ on the mesh belt 60 and the recycled paper RP may be stably maintained at a desired value.

That is, to maintain stably the weight of the wet paper $RP_0$ on the mesh belt 60, the stagnant action of the pulp suspension PS on the paper making frame body 78 is an important element, and this stagnant action depends very much on the water value (stagnant water volume) of pulp suspension PS in the paper making frame body 78. It is hence extremely important to maintain a constant water volume of pulp suspension PS.

In this pulp feeding unit (pulp feeding device) 56, since the overflow gate 83 is provided, the water volume of the pulp suspension PS in the paper making frame body 78 is maintained stably at specified value.

Moreover, the overflow gate 83 is provided at the inlet side or upstream side of the passage 81, instead of the outlet position of the passage 81, pulsation of water level H of the pulp suspension PS can be effectively prevented.

If the overflow gate 83 is provided at the outlet position of the passage 81, the pulp suspension PS is filtered by the paper making mesh structure of the mesh belt 60, and when the water level H is lowered, the pulp suspension PS flowing out from the outlet 81b of the passage 81 rides over the overflow gate 83 with a time lag, and the water level H pulsates, and lateral stripe patterns are formed in the texture of the recycled paper RP.

By contrast as in the illustrated preferred embodiment, when the overflow gate 83 is provided at the upstream position of the passage 81, such inconvenience can be effectively avoided.

At the rear side of the overflow gate 83, a pulp suspension collect unit 89 is formed and provided together with the rear wall portion of the overflow gate 83 and main body frame 80. The pulp suspension PS overflowing from the overflow gate 83 flows down and is collected in the pulp suspension collect unit 89, and is sent into the white water collect tank 20 from the drain port 89a in the bottom plate 86.

At the upstream side of the pulp feeding unit 56, a pulp feed tank 90 is provided for supplying the pulp suspension PS in the pulp feeding unit 56.

The pulp feed tank 90 collects the pulp suspension PS manufactured in the pulp making section 2, receiving from a first suspension feed pump 44. The pulp feed tank 90 is provided with an agitating device 91 for agitating the accumulated pulp suspension PS, and the concentration of the pulp suspension PS is kept uniform.

The pulp suspension PS collected in the pulp feed tank 90 is detected by lower limit level float switch 92 and upper limit level float switch 93, and is consecutively supplied into the paper making frame body 78 of the pulp feeding unit 56 by the second suspension feed pump 94.

The pulp suspension PS collected in the pulp feed tank 90 is supplied by second suspension feed pump 94 into the passage 81 in the paper making frame body 78 from the inlet 81a, and passes slowly in this meandering passage 81 as indicated by arrow in FIG. 7A, and flows on the flat plate member 82 from the outlet 81b, and is collected to a specific water level H defined by the overflow gate 83, and is diffused uniformly and supplied on the upside of the mesh belt 60 running upward obliquely toward the running direction.

The pulp suspension PS overflowing from the overflow gate 83 and collected in the pulp suspension collect unit 89 is collected in the white water collect tank 20 as mentioned above.

The action and effect of the passage structure of pulp suspension PS in the pulp feeding unit 56 may be estimated as follows.

(i) Existence of Partition Plate 87 having a Plurality of Communication Holes 87a, 87a, . . .

The partition plate 87 is provided to divide the passage 81, and a plurality of communication holes 87a, 87a, . . . are opened in the partition plate 87, and therefore the pulp suspension PS supplied from the pulp feed tank 90 is diffused entirely in the passage 81 when passing through these communication holes 87a, 87a, . . . of the partition plate 87, and the flow rate is adjusted to be uniform in the entire sectional opening of the passage 81.

(ii) Meandering Route of Passage 81

The flow passage 81 divided and formed by gate members 85 (85a, 85b, 85c) is meandering and long, and when the pulp suspension PS passes such passage 81, and is diffused uniformly.

(iii) Overflow Gate 83

By the existence of the overflow gate 83, if the supply water volume of pulp suspension PS sent into the paper making frame body 78 fluctuates, the water level H of pulp suspension PS collected in the paper making frame body 78 is always maintained constant, and hence the weight of the wet paper $RP_0$ on the mesh belt 60 is always constant.

(iv) Thin Guide Sheet 88 at Leading End Edge of Flat Plate Member 82

The leading end edge 88a of the guide sheet 88 is disposed to slide on the upper position of the mesh belt 60 supported by the beam 79a forming the louver structure of the partition member 79, and uniform filtering by the net of the mesh belt 60 is assured.

Being located between the beams 79a, 79a of the partition member 79, the pulp suspension PS tends to flow freely also in the direction of the driven roller 66 when filtered by the paper making mesh structure of the mesh belt 60, which makes it difficult to filter uniformly by mesh cells, and a locally non-uniform filtering position appears. Such non-uniform filtering causes vertical stripe patterns in the texture of recycled paper RP.

By contrast, as in the illustrated preferred embodiment, when the leading end edge 88a of the guide sheet 88 is set at the upper position of the beam 79a for forming the louver structure of the partition member 79, such inconvenience can be effectively avoided.

The dewatering roll section 51 is a location of squeezing and dewatering the wet paper $RP_0$ on the mesh belt 60 at the junction of the paper making process unit 50 and drying process unit 42 described below.

Specifically, the smooth surface belt 95 described below of the drying process unit 42 at the downstream side and the mesh belt 60 of the paper making process unit 50 at the upstream side are disposed in upper and lower layers as shown in FIG. 1 and FIG. 4, and the upper and lower adjacent portions of the sm described below ooth surface belt 95 and mesh belt 60 form the junction, and the dewatering roll section 51 rolls and squeezes the mesh belt 60 and smooth surface belt 95 from upper and lower sides.

The dewatering roll section 51 mainly includes dewatering roll 70, press roll 71, and drive motor 72, and preliminary dewatering roll 74 and slurry preventive roll 75 are auxiliary components.

The dewatering roll 70 rolls on the mesh belt 60 from the lower side, and is specifically composed of a cylindrical roll 70a of high rigidity material, and a dewatering layer 70b of porous material of fine continuous pores wound on the outer circumference thereof. The dewatering roll 70b is made of material excellent in hydrophilic property, water absorption and water retaining property, and is preferably a porous material of fine continuous pores excellent in flexibility. Rolling structure of dewatering layer 70b on the cylindrical roll 70a includes single layer structure of rolling a relatively thick dewatering layer 70b once on the outer circumference of the cylindrical roll 70a, or fitting a cylindrical dewatering layer 70b to the cylindrical roll 70a, or multilayer structure of rolling a thin cylindrical dewatering layer 70b on the outer circumference of the cylindrical roll 70a in plural layers.

The dewatering roll 70 in the illustrated preferred embodiment is a single layer structure, that is, a cylindrical dewatering layer 70b of fine porous continuous foamed material having micron-size ultrafine continuous pores is fitted to the cylindrical outer circumference of the stainless steel cylindrical roll 70a.

The press roll 71 is to roll and press the upside of the smooth surface belt 95 of the drying process unit 42 described below. Specifically, it is a cylindrical roll of high rigidity material. The press roll 71 in the illustrated preferred embodiment is a stainless steel cylindrical roll.

The dewatering roll 70 and press roll 71 are specifically driven by and coupled to a single drive motor 72, and the both rolls 70, 71 are rotated and driven in interlock. In this case, the both rolls 70, 71 are rotated and controlled so that the outer circumferences of the both rolls 70, 71 may mutually roll and contact with a slight difference in rotating speed, on the contact surfaces of the mesh belt 60 and smooth surface belt 95 (the downside of mesh belt 60 and upside of smooth surface belt 95) rolling and squeezing in pressed state between the outer circumferences.

More specifically, the rotating speed of the press roll 71 is set slightly higher than the rotating speed of the dewatering roll 70, and hence the running speed of the smooth surface belt 95 is set higher than the running speed of the mesh belt 60. In such configuration, as mentioned below, when the wet paper $RP_0$ squeezed and dewatered by the dewatering roll section 51 is rolled and transferred from the upside of the mesh belt 60 of the lower side to the downside of the smooth surface belt 95 of the upper side, tension is applied to the wet paper $RP_0$, and creasing of wet paper $RP_0$ is effectively prevented.

The drive motor 72 is, in the illustrated preferred embodiment, used commonly with the drive motor 61 of the paper making process unit 50 as described below.

By driving of drive motor 72, the both rolls 70, 71 roll and squeeze the both belts 60, 95 from upper and lower side in pressed state, and moisture M contained in the wet paper $RP_0$ on the mesh belt 60 is absorbed and dewatered by the dewatering roll 70 through the mesh belt 60. The squeezed and dewatered white water W is collected in the white water collect tank 20 of the water feed unit 13.

A specific mechanism of squeezing and dewatering is explained by referring to FIG. 8A. By rotation of both rolls 70, 71, the mesh belt 60 and smooth surface belt 95 having the wet paper $RP_0$ mounted on the upside are guided in between the rolls 70, 71 with the wet paper $RP_0$ interposed thereon, and rolled and squeezed from upper and lower sides in pressed state. As a result, the moisture M contained in the wet paper $RP_0$ is squeezed out to the upstream side of the both rolls 70, 71 (the right side in the drawing), but since the smooth surface belt 95 of the upper side has a smooth surface not having pores, the squeezed moisture M entirely passes through fine continuous pores in the mesh belt 60 and the lower side, and is absorbed in the dewatering layer 70b of the dewatering roll 70.

The preliminary dewatering roll 74 and slurry preventive roll 75 are provided to assist the squeezing and dewatering action of the press roll 71 and dewatering roll 70 in the dewatering roll section 51.

The preliminary dewatering roll 74 is disposed, as shown in FIG. 1, so as to apply tension to the mesh belt 60 by rolling from the lower side at the upstream side of the dewatering roll section 51.

The preliminary dewatering roll 74 is similar to the dewatering roll 70 in its specific structure, and is composed of a cylindrical roll 74a of high rigidity material, and a dewatering layer 74b of porous material of fine continuous pores wound on the outer circumference thereof. The preliminary dewatering roll 74 in the illustrated preferred embodiment is a single layer structure, that is, a cylindrical dewatering layer 74b of fine porous continuous foamed material having micron-size ultrafine continuous pores is fitted to the cylindrical outer circumference of the stainless steel cylindrical roll 74a.

The wet paper $RP_0$ uniformly diffused on the upside of the mesh belt 60 and conveyed together with the mesh belt 60 is filtered and dewatered by the mesh belt 60, and is also absorbed and dewatered by the preliminary dewatering roll 74, and the squeezing and dewatering action of the press roll 71 and dewatering roll 70 is assisted preliminarily.

The slurry preventive roll 75 is disposed, as shown in FIG. 1 and FIG. 8B, so as to press the smooth surface belt 95 to the wet paper $RP_0$ on the mesh belt 60 at the lower side, by rolling and pressing the smooth surface belt 95 from the upper side, near the upstream side of the dewatering roll section 51.

Referring now to FIG. 8B, when the mesh belt 60 and smooth surface belt 95 having the wet paper $RP_0$ mounted on the upside is rolled and squeezed from upper and lower side in pressed state by the dewatering roll 70 and press roll 71, the moisture M contained in the wet paper $RP_0$ is squeezed out to the upstream side (right side in the drawing) of the both rolls 70, 71, and at the same time the moisture M held as a result of previous squeezing and dewatering of the dewatering roll 70 is also squeezed.

In this case, if the slurry preventive roll 75 is not provided, as shown in FIG. 8A, near the upstream side of the both rolls 70, 71, the intersecting angle of the smooth surface belt 95 at the upper side and the mesh belt 60 at the lower side (the angle enclosed as intersection of pressing points of both rolls 70, 71 by the both belts 60, 95) is relatively large, and hence the smooth surface belt 95 at the upper side is departed from the wet paper $RP_0$ on the mesh belt 60 at the lower side. Hence, part M' of the total moisture M of the moisture contained in the wet paper $RP_0$ squeezed to the upstream side of the both rolls 70, 71 and moisture held in the dewatering roll 70 is not absorbed by the dewatering roll 70 through the mesh belt 60, but may be absorbed in the wet paper $RP_0$, and the wet paper $RP_0$ may return to the state of slurry.

If the intersecting angle of the smooth surface belt 95 at the upper side and the mesh belt 60 at the lower side is not so large, such problem does not occur, and installation of slurry preventive roll 75 may be omitted.

The wet paper $RP_0$ squeezed and dewatered by the dewatering roll section 51, at the downstream side position of the dewatering roll section 51, is rolled and transferred on the downside of the smooth surface belt 95 at the upper side from the upside of the mesh belt 60 at the lower side, and is conveyed together with the smooth surface belt 95, and dried by the drying process unit 42.

This transfer action is considered to occur from the smooth surface structure of the smooth surface belt 95. That is, the surface of the mesh belt 60 at the lower side is a rough surface having numerous continuous fine pores, while the surface of the smooth surface belt 95 at the upper side is a smooth surface not having pores. As a result, the wet paper $RP_0$ slightly containing moisture is estimated to be attracted by the surface tension on the surface of the smooth surface belt 95.

As mentioned above, the running speed of the smooth surface belt 95 is set higher than the running speed of the mesh belt 60, and when the wet paper $RP_0$ squeezed and dewatered by the dewatering roll section 51 is transferred and rolled on the downside of the smooth surface belt 95 at the upper side from the upside of the mesh belt 60 at the lower side, since a tension is applied to the wet paper $RP_0$ by the difference in speed, the wet paper $RP_0$ is not creased, but is smoothly transferred onto the smooth surface belt 95.

The drying process unit 42 mainly includes a drying conveyor 91 and a drying and heating unit 92, being installed at a position of obtaining recycled paper RP after drying the wet paper $RP_0$ squeezed and dewatered in the dewatering roll section 51 after paper making process on the paper making process unit 50.

The drying conveyor 91 is for conveying the wet paper $RP_0$ squeezed and dewatered by the dewatering roll section 51 while smoothing it, and includes the smooth surface belt 95 and a drive motor 96 for driving the smooth surface belt 95.

The smooth surface belt 95 is for conveying the wet paper $RP_0$ while heating and drying it, and is specifically an endless belt of plate member of smooth surface structure having a specified width formed continuously in a ring in specified length.

The specified width is set slightly larger than the width of the recycled paper RP to be manufactured same as in the mesh belt 60. The plate material of the smooth surface structure can be finished to an appropriate smooth surface on one side of the wet paper $RP_0$, so as to withstand heating action by the heating and drying unit 97 described below, and is preferably made of elastic heat resistant material such as fluoroplastic or stainless steel, and a fluoroplastic belt is used in the shown preferred embodiment. The specified length is long enough so that the wet paper $RP_0$ may be heated and dried to be a completed product of recycled paper RP, and is set to a size enough to be accommodated in the storing space of the drying belt conveyor 42 in the apparatus case 5.

The smooth surface belt 95 is rotatably suspended and supported by way of drive roller 100, follower rollers 101, 102, press roll 71, slurry preventive roll 75, smooth surface finishing rolls 103, 103, and preliminary dewatering roll 74 as shown in FIG. 1 and FIG. 4, and is driven by and coupled to the drive motor 96 by way of the drive roller 100.

The drive motor 96 for driving the smooth surface belt 95 is commonly used as the driving source of the paper making process unit 50 and dewatering roll section 41 as mentioned above, and this common structure or drive coupling mechanism is shown in FIG. 6.

In FIG. 4, reference numeral 105 is a power transmission gear, numeral 106 is a sprocket, numeral 107 is a power transmission chain applied between the sprockets 106, 106, and numeral 78 is a power transmission shaft.

The gear ratio of power transmission gears 105, 105, . . . and sprockets 106, 106, . . . is determined so that all of the drive roller 100, follower rollers 101, 102, press roll 71, slurry preventive roll 75, smooth surface finishing rolls 103, 103, and preliminary dewatering roll 74 may roll and contact on the smooth surface belt 95 substantially at an identical peripheral speed because the drive source is a single drive motor 96.

The heating and drying unit 92 is a location for heating and drying the wet paper $RP_0$ on the smooth surface belt 95, and includes a heater plate 109 as a heating unit disposed in the running route of the smooth surface belt 95.

The heater plate 109 in the shown preferred embodiment is provided in the horizontal running portion in the running route of the smooth surface belt 95, and more specifically provided in contact with the opposite side of the upside of the holding side of the wet paper $RP_0$, that is, on the downside, on the smooth surface endless belt 95. Hence, the wet paper $RP_0$ on the smooth surface belt 95 is heated and dried indirectly through the smooth surface belt 95 heated by the heater plate 109.

In the running route of the smooth surface belt 95, the two smooth surface finishing rolls 103, 103 are disposed. Specifically, these smooth surface finishing rolls 103, 103 are disposed parallel opposite to the heater plate 109 in the horizontally running portion in the running route of the smooth surface belt 95.

The both smooth surface finishing rolls 103, 103 sequentially roll and press the wet paper $RP_0$ on the smooth surface belt 95, and finish the one side and opposite side of the wet paper $RP_0$ contacting with the surface of the smooth surface belt 95 to a proper smooth surface.

In the shown preferred embodiment, two smooth surface finishing rolls 103, 103 are provided, but the number of smooth surface finishing rolls may be properly increased or decreased depending on the purpose.

At the downstream side of the heating and drying unit 92 of the smooth surface belt 95, a stripping member 110 is provided. Specifically, the striping member 110 is a heat resistant elastic spatula, and the stripping member 110 of the illustrated preferred embodiment is made of an elastically deformable stainless steel plate of about 0.1 to 0.3 mm in thickness coated with Teflon (registered trademark) on the outer circumference, and its base end is supported at the fixed side (not shown), and its leading end edge 110a elastically abuts and stops on the surface of the smooth surface belt 95.

The paper dried and conveyed on the smooth surface belt 95, that is, the recycled paper RP is sequentially separated from the holding side of the smooth surface belt 95 by the leading end edge 110a of the stripping member 110.

In this relation, at the downstream side of the stripping member 110, that is, at the terminal end position of running route of the smooth surface belt 95 or the terminal end position of the drying process unit 42, a size cutter 111 is provided for cutting the recycled paper RP separated from the smooth surface belt 95 to a specified size and shape (only the length is shown in the drawing). The size cutter 111 is not particularly shown in the drawing, but may be realized by known structure, such as double-side slitter, or guillotine cutter by solenoid.

The recycled paper RP separated from the smooth surface belt 95 is cut to a specified length by the size cutter 111 (vertical size of A4 format in the shown preferred embodiment), and the recycle paper RP of proper size is obtained, and discharged from the discharge port 5b of the apparatus case 5. Cutting in specified length is realized by measuring the belt feed rate of the smooth surface belt 95 by proximity switch, encoder and other sensors.

The control section 4 automatically controls the operation of driving parts of the macerating unit 10 and paper making section 3 by cooperating mutually, and is composed of a microcomputer specifically including CPU, ROM, RAM, and I/O ports.

The control section 4 stores programs for continuously executing the pulp manufacturing process of the pulp making section 2 and paper making process of the paper making section 3, and also stores preliminarily various data including the driving time of agitating device 12 in the macerating unit 10, operation timing of water feed unit 13, running speed of conveyors 40, 42 in the paper making section 3, driving time of heating and drying unit 92, and operation timing of size cutter 111, through keyboard or selective input setting.

Various devices are electrically connected to the control section 4 as mentioned above, such as float switches 28, 29, 43, 87, 88, and drive units 17, 874, 61 (72, 96), 89, 105, 111, and the control section 4 controls these drive units 17, 874, 61 (72, 96), 89, 105, 111, according to the measured values and data.

The used paper recycling apparatus 1 having such configuration is started by turning on the power, and the control section 4 automatically controls these drive units in mutual relation, and executes the following processes, that is, the used paper UP, UP, . . . charged in the inlet 5a of the apparatus case 5 are macerated and mashed by the pulp making section 2, the macerating section 10 and mashing section 11, and used paper pulp UPP is manufactured, and this used paper pulp UPP is processed in the paper making process unit 50, dewatering roll section 51, and drying process unit 52 of the paper making section 3, and is regenerated as recycled paper RP, and is discharged into the recycled paper receive tray 7 from the discharge port 5b of the apparatus case 5.

In the used paper recycling apparatus 1 having such configuration, the pulp feeding section (pulp feeding device) 56 of the paper making section 3 includes a partition member 79 disposed slidably on the downside of the endless mesh belt 60 running in the paper making process unit 50, and a paper making frame body 78 disposed slidably on the upside of the mesh belt 60 for defining the supply width of pulp suspension PS sent from the pulp manufacturing section 2, and an overflow gate 83 is provided in this paper making frame body 78 for keeping constant the water level of the collected pulp suspension PS, and the pulp suspension PS supplied in the paper making frame body 78 is collected up to a specific water level H defined by the overflow gate 83, and is uniformly diffused and supplied on the upside of the mesh belt 60 running upward obliquely toward the running direction, and hence if the supply water volume of pulp suspension PS sent into the paper making frame body 78 fluctuates, the water level H of pulp suspension PS staying in the paper making frame body 78 is always kept constant, and the weight of the wet paper $RP_0$ on the mesh belt 60 is stable, and recycled paper RP of uniform texture is obtained.

In the paper machine 3 having such pulp feeding section 56, the following excellent effects are obtained, and thereby, the used paper recycling apparatus 1 including the paper machine 3 can be installed not only in a large office, but also in a small shop or a room in general household, is friendly to the environment and low in running cost, capable of preventing leak of confidential information, private information, and other information, and keeping a high confidentiality.

(1) In the apparatus case 5 of furniture size, the used paper recycling apparatus 1 of small size and simple structure includes the pulp making section 2 for manufacturing used paper pulp UPP by macerating and mashing used paper UP, and the paper making section (paper machine) 3 for manufacturing recycled paper RP by making the used paper pulp UPP manufactured in the pulp making section 2, and the used paper UP can be recycled at the site of origin without discarding the used paper UP, and disposal of used paper UP is decreased, and not only the refuse problems can be solved, but also the limited resources can be utilized effectively.

In particular, from confidential problems, recycling of private and confidential used paper UP is not promoted, and by recycling the used paper UP at the site of origin, the resources can be utilized effectively.

(2) At the site of origin of used paper UP, a compact used paper recycling system having a same function as large scale system installed in paper making plant or used paper recycling plant is installed, and used paper UP can be recycled continuously in a closed circuit in a small shop or general household, and refuse collection and transportation expenses and incineration and other costs are saved, and it is very economical.

(3) Moreover, the apparatus structure is compact, and it can be installed not only in large office, but also in small shop or general household, and from this point of view, too, leak of confidential information and private information can be securely prevented.

(4) Being installed at the site of origin of used paper UP, the pulp making section 2 macerates the used paper UP into used paper pulp UPP, and the paper making section 3 manufactures the used paper pulp UPP into recycled paper RP, and information of characters and patterns printed on the used paper UP is not diffused outside of the site of origin of used paper UP, and leak of confidential information and private information can be prevented securely, and a high confidentiality is held and the resources can be utilized effectively.

That is, by using the used paper recycling apparatus 1 having the paper machine 3 of the preferred embodiment as the paper making section, it is free from risk of external diffusion of various information from the closed system of its use (for example, school, hospital, city office, law firm, patent office, general household).

In other words, in the case of a conventional shredder, if the used paper is shredded into small chips, and the printed characters and patterns are not legible, the shredded chips are incinerated, and external diffusion cannot be prevented perfectly. In this regard, the waste chips may be stored within an internal warehouse, but storing place is needed, and the resources are used only once and are not utilized effectively.

By contrast, according to the used paper recycling apparatus 1 of the preferred embodiment, the information printed on the used paper UP is not diffused outside of the closed system, and the resources can be utilized effectively.

Preferred Embodiment 2

Figure 10:
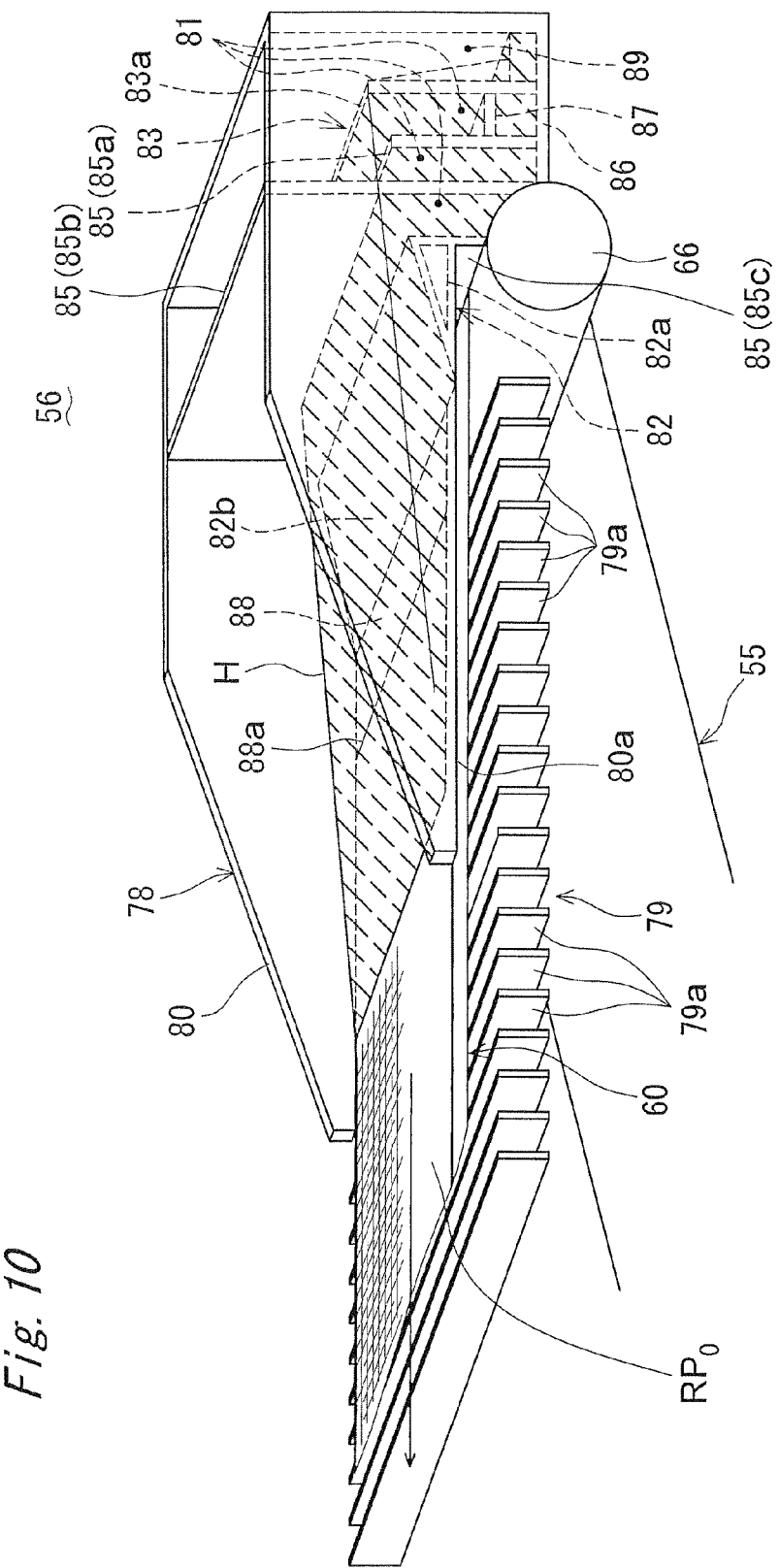
FIG. 10 is a magnified perspective view of pulp feeding section in paper making section of used paper recycling apparatus in preferred embodiment 2 of the invention.

This preferred embodiment is shown in FIG. 10, FIG. 11A, and FIG. 11B, and is similar to preferred embodiment 1, except that the structure of paper making frame body 78 is slightly modified.

In this preferred embodiment, a flat plate member 82 disposed at the position of outlet 81b side of the passage 81 is disposed in a down slope of downward inclination toward the running direction of mesh belt 60, instead of up slope of upward inclination in preferred embodiment 1.

Specifically, the flat plate member 82 is formed, together with gate member 85c, in a hollow framework having a triangular sectional contour as shown in the drawing, and a lower side plate member 82a covers the mesh cells of the mesh belt 60 from the upper side in closed state, and an upper side plate member 82b is set and disposed in a down slope of downward inclination toward the running direction of the mesh belt 60.

Thus, in the meandering passage 81, as indicated by arrow in FIG. 7A, the pulp suspension PS passes slowly, and flows down from the outlet 81b of the passage 81 onto the upper side plate member 82b of the flat plate member 82, and is collected to a specific water level H defined by the overflow gate 83, and is thus uniformly disposed and supplied on the upside of the mesh belt 60 running upward obliquely toward the running direction.

In this case, since the flat plate member 82 is formed in down slope of downward inclination, occurrence of turbulent flow of pulp suspension PS staying on the flat plate member 82 can be effectively prevented, and the texture of the recycled paper RP can be further improved.

Instead, if the flat plate member 82 is formed in up slope, the pulp suspension PS flowing down from the outlet 81b of the passage 81 onto the flat plate member 82 climbs up the flat plate member 82, and turbulent flow may occur in the pulp suspension PS, and if turbulent flow occurs in the pulp suspension PS staying on the flat plate member 82, an adverse effect may be given to the texture of the recycled paper RP manufactured by the mesh belt 60.

In this preferred embodiment, considering this point, the flat plate member 82 of down slope is used, and the pulp suspension PS flowing from the outlet 81b of the passage 81 onto the flat plate member 82 flows down smoothly on the upside of the flat plate member 82, and occurrence of turbulent flow is effectively prevented, and the texture of the recycled paper RP is much improved.

Other configuration and action are same s in preferred embodiment 1.

As the invention may be embodied in several forms without departing from the spirit of essential characteristics thereof, the present preferred embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A pulp feeder for used paper recycling apparatus for composing a pulp feeding section of a paper machine for manufacturing recycled paper from used paper pulp manufactured in pulp making section in preceding process, in a used paper recycling apparatus of furniture size small enough to be installed at the site of origin of used paper, comprising:
    a partition member disposed slidably on the downside of an endless mesh belt running in a paper making process unit, and
    a paper making frame body disposed slidably on the upside of the endless mesh belt for defining the supply width of slurry pulp suspension containing water and used paper pulp sent from the pulp making section,
    wherein an overflow gate is provided in the paper making frame body for keeping constant the water level of the collected pulp suspension, and
    the pulp suspension supplied in the paper making frame body is collected up to a specific water level defined by the overflow gate, and is uniformly diffused and supplied on the upside of the endless mesh belt running upward obliquely toward the running direction, by cooperating stagnant action of the pulp suspension on the paper making frame body and the running action of the endless mesh belt.

2. The pulp feeder for used paper recycling apparatus of claim 1,
    wherein a meandering passage for promoting uniform diffusion of supplied pulp suspension is provided at the downstream side of the overflow gate in the paper making frame body.

3. The pulp feeder for used paper recycling apparatus of claim 2,
    wherein the vertically meandering passage is provided in the paper making frame body, and a flat plate member for closing the mesh cells of the mesh belt in closed state from the upside is provided at the outlet side position of the passage, and
    the pulp suspension supplied in the paper making frame body passes through the meandering passage, and is collected to specific water level defined by the overflow gate, and is uniformly diffused and supplied on the upside of the endless mesh belt running upward obliquely toward the running direction.

4. The pulp feeder for used paper recycling apparatus of claim 1,
    wherein the partition member has a louver structure slidably supporting the downside of the mesh belt.

5. The pulp feeder for used paper recycling apparatus of claim 3,
    the passage is formed of a plurality of gate members disposed in the paper making frame body.

6. The pulp feeder for used paper recycling apparatus of claim 5,
    wherein the plurality of gate members are disposed in upright position in the paper making frame body, and the passage is bent vertically, and
    the running direction of the passage is extended upward from its inlet, and extended upward toward the outlet.

7. The pulp feeder for used paper recycling apparatus of claim 6,
    wherein a partition plate is disposed near the inlet of the passage, and a plurality of communication holes are disposed in the partition plate at specified intervals, and
    out of the upright gate members provided in the paper making frame body, the upper end edge of the gate member for forming the partition of changing position from upward to downward direction of the passage is set to be lower than the water level of the pulp suspension staying on the flat plate member.

8. The pulp feeder for used paper recycling apparatus of claim 3,
    wherein the flat plate member of the paper making frame body is set and disposed in up slope of upward inclination parallel to running direction of the mesh belt.

9. The pulp feeder for used paper recycling apparatus of claim 3,
    wherein the flat plate member of the paper making frame body is set and disposed in down slope of downward inclination toward running direction of the mesh belt.

10. The pulp feeder for used paper recycling apparatus of any one of claims 3, 8 and 9, wherein a thin guide sheet is provided at the leading end edge of the flat plate member of the paper making frame body for assuring a smooth flow of pulp suspension on the mesh belt, and the leading end edge of the guide sheet is disposed slidably on upside position of the mesh belt supported by beams for forming the louver structure of the partition member.

11. The pulp feeder for used paper recycling apparatus of claim 5, wherein the paper making frame body defines the supply width of the pulp suspension as its frame inner width is set at the width size of the recycled paper to be manufactured, and its lower end side is disposed to slide on the upside of the mesh belt running obliquely.

12. A paper machine for used paper recycling apparatus for composing a used paper recycling apparatus of furniture size small enough to be installed at the site of origin of used paper for manufacturing recycled paper from used paper pulp manufactured in a pulp making device in a preceding process, comprising:

a paper making process unit for manufacturing wet paper from slurry pulp suspension containing water and used paper pulp sent from the pulp making device, wherein the paper making process unit includes a paper making conveyor for processing and conveying the pulp suspension, and a pulp feeding section disposed at start end position of paper making process of this paper making conveyor for supplying the pulp suspension from the pulp making device into the paper making conveyor, this pulp feeding section has a partition member disposed slidably on the downside of an endless mesh belt running in a paper making process unit, and a paper making frame body disposed slidably on the upside of the endless mesh belt for defining the supply width of slurry pulp suspension containing water and used paper pulp sent from the pulp making section, an overflow gate is provided in the paper making frame body for keeping constant the water level of the collected pulp suspension, and the pulp suspension supplied in the paper making frame body is collected up to a specific water level defined by the overflow gate, and is uniformly diffused and supplied on the upside of the endless mesh belt running upward obliquely toward the running direction, by cooperating stagnant action of the pulp suspension on the paper making frame body and the running action of the endless mesh belt.

13. The paper machine for used paper recycling apparatus of claim 12, further comprising:

the paper making process unit for manufacturing wet paper from slurry pulp suspension containing water and used paper pulp sent from the pulp making device, a drying process unit for manufacturing recycled paper by drying the wet paper manufactured and formed in the paper making process unit, and a dewatering roll section for squeezing and dewatering the wet paper at the junction of the paper making process unit and the drying process unit, wherein the pulp suspension supplied from the pulp making device is processed, dewatered and dried.

14. A used paper recycling apparatus comprising, in an apparatus case of furniture size, a pulp making section for manufacturing used paper pulp by macerating and mashing used paper, a paper making section for manufacturing recycled paper from used paper pulp manufactured in the pulp making section, and a control section for driving and controlling the pulp making section and paper making section in interlock, wherein the paper making section includes a paper making process unit for manufacturing wet paper from slurry pulp suspension containing water and used paper pulp sent from the pulp making section, the paper making process unit includes a paper making conveyor for processing and conveying pulp suspension, and a pulp feeding section disposed at start end position of paper making process of the paper making conveyor for supplying the pulp suspension from the pulp making device to the paper making conveyor, this pulp feeding section has a partition member disposed slidably on the downside of an endless mesh belt running in a paper making process unit, and a paper making frame body disposed slidably on the upside of the endless mesh belt for defining the supply width of slurry pulp suspension containing water and used paper pulp sent from the pulp making section, an overflow gate is provided in the paper making frame body for keeping constant the water level of the collected pulp suspension, and the pulp suspension supplied in the paper making frame body is collected up to a specific water level defined by the overflow gate, and is uniformly diffused and supplied on the upside of the endless mesh belt running upward obliquely toward the running direction, by cooperating stagnant action of the pulp suspension on the paper making frame body and the running action of the endless mesh belt.

* * * * *